United States Patent
Saitou et al.

(10) Patent No.: US 7,031,581 B2
(45) Date of Patent: Apr. 18, 2006

(54) WAVELENGTH DIVISION MULTIPLEXED TRANSMISSION PATH AND DISPERSION-COMPENSATING FIBER USED THEREIN

(75) Inventors: Manabu Saitou, Sakura (JP); Kazuhiko Aikawa, Sakura (JP); Shoichiro Matsuo, Sakura (JP)

(73) Assignee: Fujikura Ltd., Tokyo (JP)

( * ) Notice: Subject to any disclaimer, the term of this patent is extended or adjusted under 35 U.S.C. 154(b) by 815 days.

(21) Appl. No.: 10/097,694

(22) Filed: Mar. 12, 2002

(65) Prior Publication Data

US 2002/0164139 A1 Nov. 7, 2002

(30) Foreign Application Priority Data

Mar. 15, 2001 (JP) ............................ 2001-074525
Jan. 10, 2002 (JP) ............................ 2002-003890

(51) Int. Cl.
G02B 6/02 (2006.01)
G02B 6/16 (2006.01)

(52) U.S. Cl. ........................ 385/123; 385/24; 385/126; 398/81; 398/158

(58) Field of Classification Search ................ 385/24, 385/123, 126, 127; 398/79, 81, 158
See application file for complete search history.

(56) References Cited

U.S. PATENT DOCUMENTS

| | | | |
|---|---|---|---|
| 5,613,027 A | 3/1997 | Bhagavatula | 385/123 |
| 5,838,867 A | 11/1998 | Onishi et al. | 385/123 |
| 5,956,440 A | 9/1999 | Mikami et al. | 385/24 |
| 5,999,679 A | 12/1999 | Antos et al. | 385/123 |
| 6,009,221 A | 12/1999 | Tsuda | 385/123 |
| 6,011,892 A | 1/2000 | Chraplyvy et al. | 385/123 |
| 6,263,138 B1 | 7/2001 | Sillard et al. | 385/123 |
| 6,317,549 B1 * | 11/2001 | Brown | 385/123 |
| 6,510,268 B1 * | 1/2003 | de Montmorillon et al. | 385/123 |

(Continued)

FOREIGN PATENT DOCUMENTS

EP 1116970 A1 * 7/2001

(Continued)

OTHER PUBLICATIONS

Knudsen, S., et al., "Large effective area dispersion compensating fiber for cabled compensation of standard single mode fiber," Optical Fiber Communication Conference 2000, Baltimore Convention Center, Baltimore, Maryland, Mar. 7-10, 2000, pp. 98-100.

(Continued)

Primary Examiner—Akm Enayet Ullah
Assistant Examiner—Daniel Petkovsek
(74) Attorney, Agent, or Firm—Bell, Boyd & Lloyd LLC

(57) ABSTRACT

In a wavelength division multiplexed transmission path, the used waveband can be selected from the widest possible waveband among the S-band, C-band, and L-band. The wavelength division multiplexed transmission path has a dispersion-compensating transmission path comprising a dispersion-shifted fiber, which has positive chromatic dispersion throughout a range of wavelengths from 1460 nm to 1630 nm, and one type of dispersion-compensating fiber, or two or more types of dispersion-compensating fiber having different chromatic dispersion having negative chromatic dispersion in a compensation waveband, selected from the abovementioned range; the residual chromatic dispersion of the wavelength division multiplexed transmission path is adjusted so as to be greater than −1.0 ps/nm/km or equal to and less than or equal to +1.0 ps/nm/km in a used waveband of the wavelength division multiplexed transmission path, which is selected from the abovementioned range.

9 Claims, 20 Drawing Sheets

U.S. PATENT DOCUMENTS

| | | | |
|---|---|---|---|
| 6,611,637 B1* | 8/2003 | Okuno et al. | 385/24 |
| 6,628,873 B1* | 9/2003 | Sillard et al. | 385/124 |
| 6,668,120 B1* | 12/2003 | Sillard et al. | 385/123 |
| 6,684,018 B1* | 1/2004 | Arai et al. | 385/127 |
| 6,763,168 B1* | 7/2004 | de Montmorillon et al. | 385/127 |

FOREIGN PATENT DOCUMENTS

| | | |
|---|---|---|
| JP | 10-319266 | 12/1998 |
| JP | 10-325913 | 12/1998 |
| JP | 2000-047048 | 2/2000 |
| WO | WO 99/66660 | 12/1999 |
| WO | WO 00/17685 | 3/2000 |
| WO | WO 00/38356 | 6/2000 |
| WO | WO 01/01179 | 1/2001 |

OTHER PUBLICATIONS

Grüner-Nielsen, L., et al., "New dispersion compensating fibres for simultaneous compensation of dispersion and dispersion slope of non-zero dispersion shifted fibres in the C or L band," Optical Fiber Communication Conference 2000, Baltimore Convention Center, Baltimore, Maryland, Mar. 7-10, 2000, pp. 101-103.

Gnauck, A., et al., "Dispersion and Dispersion-Slope Compensation of NZDSF for 40-Gb/s Operation over the Entire C Band," Optical Fiber Communication Conference 2000, Post Deadline Paper, Baltimore Convention Center, Baltimore, Maryland, Mar. 7-10, 2000, 4 pages.

Ryuichi Sugizaki, "Dispersion slope compensating fibers for L-band WDM systems using NZ-DSF," Optical Fiber Communication Conference 2000, Baltimore Convention Center, Baltimore, Maryland Mar. 7-10, 2000, pp. 95-97.

Yanada, E., et al., "Dual-band Hybrid Transmission Line Consisting of Pure Silica Core Fiber and Dispersion Compensating Fiber," Optical Fiber Communication Conference 2000, Baltimore Convention Center, Baltimore, Maryland, Mar. 7-10, 2000, pp. 92-94.

Fujii, T., et al., "High Performance Dispersion Compensating Fiber Modules By 'Stress-Free Coil 'Packaging Technique," National Fiber Optic Engineers Conference, Colorado Convention Center, Denver, Colorado, Aug. 27-31, 2000, pp. 420-429.

* cited by examiner

FIG. 4A

| r11 (μm) | r12 (μm) | Δ11 (%) | Δ12 (%) |
|---|---|---|---|
| 3.0 | 4.0 | 0.05 | 1.10 |

FIG. 4B

| TRANSMISSION LOSS (dB/km) at 1550 nm | CHROMATIC DISPERSION (ps/nm/km) UPPER LEVEL: at 1550 nm LOWER LEVEL: at 1460-1630 nm | DISPERSION SLOPE (ps/nm²/km) at 1550 nm | 2mλc (μm) | EFFECTIVE AREA (μm²) at 1550 nm | BENDING LOSS (dB/m) at 1550 nm |
|---|---|---|---|---|---|
| 0.231 | 9.8<br>2.0~16.0 | 0.08 | 1.56 | 103.8 | 5.7 |

FIG. 5A

| r3 (μm) | Δ1 (%) | Δ2 (%) | Δ3 (%) | r2/r1 | r3/r1 | DISPERSION COMPENSATION RATE (%) at 1495 nm |
|---|---|---|---|---|---|---|
| 8.15 | 1.2 | -1.2 | 0.3 | 2.6 | 4.2 | 86 |

FIG. 5B

| TRANSMISSION LOSS (dB/km) at 1495 nm | CHROMATIC DISPERSION (ps/nm/km) UPPER LEVEL: at 1495 nm LOWER LEVEL: at 1460-1530 nm | DISPERSION SLOPE (ps/nm²/km) UPPER LEVEL: at 1495 nm LOWER LEVEL: at 1550 nm | 2mλc (μm) | EFFECTIVE AREA (μm²) at 1495 nm | BENDING LOSS (dB/m) at 1495 nm |
|---|---|---|---|---|---|
| 0.365 | -11.3<br>-7.2~-19.4 | -0.15<br>-0.48 | 1.38 | 13.2 | 0.2 |

FIG. 6A

| r3 (μm) | Δ1 (%) | Δ2 (%) | Δ3 (%) | r2/r1 | r3/r1 | DISPERSION COMPENSATION RATE (%) at 1550nm |
|---|---|---|---|---|---|---|
| 7.72 | 1.1 | -0.7 | 0.35 | 2.6 | 4.0 | 100 |

FIG. 6B

| TRANSMISSION LOSS (dB/km) at 1550nm | CHROMATIC DISPERSION (ps/nm/km) UPPER LEVEL: at 1550nm LOWER LEVEL: at 1530-1570nm | DISPERSION SLOPE (ps/nm²/km) at 1550nm | 2mλc (μm) | EFFECTIVE AREA (μm²) at 1550nm | BENDING LOSS (dB/m) at 1550nm |
|---|---|---|---|---|---|
| 0.300 | -62.3<br>-52.8~-73.3 | -0.51 | 1.46 | 19.3 | 15.1 |

FIG. 7A

| r3 (μm) | Δ1 (%) | Δ2 (%) | Δ3 (%) | r2/r1 | r3/r1 | DISPERSION COMPENSATION RATE (%) at1600nm |
|---|---|---|---|---|---|---|
| 7.91 | 1.4 | −0.7 | 0.25 | 2.6 | 4.8 | 102 |

FIG. 7B

| TRANSMISSION LOSS (dB/km) at1600nm | CHROMATIC DISPERSION (ps/nm/km) UPPER LEVEL : at1600nm LOWER LEVEL : at1570-1630nm | DISPERSION SLOPE (ps/nm²/km) at1600nm | 2mλc (μm) | EFFECTIVE AREA (μm²) at1600nm | BENDING LOSS (dB/m) at1600nm |
|---|---|---|---|---|---|
| 0.326 | −111.7<br>−93.4〜−130.0 | −0.63 | 1.46 | 19.0 | 16.4 |

FIG. 9A

| r3 (μm) | Δ1 (%) | Δ2 (%) | Δ3 (%) | r2/r1 | r3/r1 | DISPERSION COMPENSATION RATE (%) at 1510 nm |
|---|---|---|---|---|---|---|
| 7.5 | 1.1 | -1.1 | 0.4 | 2.4 | 3.6 | 99.5 |

FIG. 9B

| TRANSMISSION LOSS (dB/km) at 1510 nm | CHROMATIC DISPERSION (ps/nm/km) UPPER LEVEL: at 1510 nm LOWER LEVEL: at 1490-1530 nm | DISPERSION SLOPE (ps/nm²/km) UPPER LEVEL: at 1510 nm LOWER LEVEL: at 1550 nm | 2mλc (μm) | EFFECTIVE AREA (μm²) at 1510 nm | BENDING LOSS (dB/m) at 1510 nm |
|---|---|---|---|---|---|
| 0.358 | -15.5 / -11.9~-20.2 | -0.21 / -0.36 | 1.42 | 15.4 | 0.4 |

FIG. 11A

| | r3 (μm) | Δ1 (%) | Δ2 (%) | Δ3 (%) | r2/r1 | r3/r1 | DISPERSION COMPENSATION RATE (%) at 1490 nm | DISPERSION COMPENSATION RATE (%) at 1510 nm |
|---|---|---|---|---|---|---|---|---|
| 1 | 7.24 | 1.40 | -1.20 | 0.35 | 2.6 | 4.2 | 59 | 92 |
| 2 | 8.12 | 1.20 | -1.20 | 0.25 | 2.4 | 4.2 | 65 | 99 |
| 3 | 8.07 | 1.20 | -1.10 | 0.30 | 2.6 | 4.2 | 62 | 97 |
| 4 | 8.59 | 1.10 | -1.10 | 0.20 | 2.4 | 4.2 | 68 | 103 |
| 5 | 7.87 | 1.10 | -1.10 | 0.30 | 2.4 | 3.8 | 69 | 102 |
| 6 | 8.25 | 1.10 | -1.10 | 0.25 | 2.4 | 4.0 | 70 | 105 |
| 7 | 7.65 | 1.20 | -1.20 | 0.35 | 2.4 | 3.8 | 70 | 103 |
| 8 | 7.45 | 1.20 | -1.20 | 0.40 | 2.6 | 3.8 | 72 | 110 |
| 9 | 7.55 | 1.10 | -1.20 | 0.40 | 2.4 | 3.6 | 90 | 127 |

FIG. 11B

| | TRANSMISSION LOSS (dB/km) | CHROMATIC DISPERSION (ps/nm/km) | DISPERSION SLOPE (ps/nm²/km) | 2mλc (μm) | EFFECTIVE AREA (μm²) | BENDING LOSS (dB/m) |
|---|---|---|---|---|---|---|
| | | at 1490 nm | at 1490 nm | | at 1490 nm | at 1490 nm |
| 1 | 0.384 | -41.4 | -0.46 | 1.38 | 11.7 | 0.3 |
| 2 | 0.367 | -19.7 | -0.24 | 1.33 | 13.4 | 0.3 |
| 3 | 0.375 | -15.4 | -0.18 | 1.38 | 13.5 | 0.2 |
| 4 | 0.364 | -8.8 | -0.11 | 1.21 | 14.6 | 0.3 |
| 5 | 0.356 | -9.3 | -0.12 | 1.31 | 14.9 | 0.1 |
| 6 | 0.364 | -8.8 | -0.12 | 1.29 | 14.8 | 0.2 |
| 7 | 0.374 | -8.4 | -0.11 | 1.42 | 13.8 | 0.1 |
| 8 | 0.369 | -8.4 | -0.11 | 1.34 | 13.3 | 0.1 |
| 9 | 0.351 | -8.2 | -0.14 | 1.42 | 14.8 | 0.1 |

FIG. 11C

| | RATIO OF LENGTHS OF DISPERSION-SHIFTED FIBER AND DISPERSION-COMPENSATING FIBER | COMPENSATION WAVELENGTH RANGE (nm) | MAXIMUM ABSOLUTE VALUE OF RESIDUAL DISPERSION IN COMPENSATION WAVELENGTH RANGE (ps/nm/km) |
|---|---|---|---|
| 1 | 8.3:1 | 1490~1530 | 0.20 |
| 2 | 4.0:1 | 1490~1530 | 0.15 |
| 3 | 3.1:1 | 1490~1530 | 0.15 |
| 4 | 1.8:1 | 1490~1530 | 0.12 |
| 5 | 1.9:1 | 1490~1530 | 0.11 |
| 6 | 2.5:1 | 1460~1530 | 0.83 |
| 7 | 2.3:1 | 1460~1530 | 0.81 |
| 8 | 3.5:1 | 1460~1530 | 0.93 |
| 9 | 2.1:1 | 1460~1530 | 0.62 |

FIG. 12A

| r3 (μm) | Δ1 (%) | Δ2 (%) | Δ3 (%) | r2/r1 | r3/r1 | DISPERSION COMPENSATION RATE (%) at 1550 nm | DISPERSION COMPENSATION RATE (%) at 1600 nm |
|---|---|---|---|---|---|---|---|
| 7.05 | 1.62 | -0.94 | 0.34 | 2.6 | 4.6 | 94 | 107 |

FIG. 12B

| TRANSMISSION LOSS (dB/km) UPPER LEVEL : at 1550 nm | LOWER LEVEL : at 1600 nm | CHROMATIC DISPERSION (ps/nm/km) UPPER LEVEL : at 1550 nm | LOWER LEVEL : at 1600 nm | DISPERSION SLOPE (ps/nm²/km) UPPER LEVEL : at 1550 nm | LOWER LEVEL : at 1600 nm | 2mλc (μm) | EFFECTIVE AREA (μm²) UPPER LEVEL : at 1550 nm | LOWER LEVEL : at 1600 nm | BENDING LOSS (dB/m) UPPER LEVEL : at 1550 nm | LOWER LEVEL : at 1600 nm |
|---|---|---|---|---|---|---|---|---|---|---|
| 0.348 | 0.402 | -130.5 | -184.9 | -1.00 | -1.08 | 1.50 | 13.9 | 17.8 | 1.3 | 22.5 |

FIG. 14A

| | r3 (μm) | Δ1 (%) | Δ2 (%) | Δ3 (%) | r2/r1 | r3/r1 | DISPERSION COMPENSATION RATE (%) at 1550 nm |
|---|---|---|---|---|---|---|---|
| 1 | 8.96 | 1.00 | -0.94 | 0.16 | 2.0 | 4.2 | 100 |
| 2 | 8.99 | 1.00 | -0.90 | 0.20 | 2.0 | 4.2 | 91 |
| 3 | 8.39 | 1.02 | -0.96 | 0.18 | 2.0 | 3.8 | 100 |
| 4 | 8.65 | 1.29 | -0.97 | 0.22 | 2.2 | 4.3 | 97 |
| 5 | 6.57 | 1.52 | -0.96 | 0.28 | 2.6 | 4.2 | 100 |
| 6 | 7.45 | 1.54 | -0.90 | 0.34 | 2.8 | 4.6 | 100 |
| 7 | 7.51 | 1.60 | -0.98 | 0.28 | 3.0 | 4.8 | 100 |
| 8 | 7.50 | 1.60 | -0.92 | 0.28 | 2.6 | 5.0 | 92 |
| 9 | 6.81 | 1.60 | -0.88 | 0.34 | 2.8 | 4.6 | 100 |

FIG. 15A

| | r3 (μm) | Δ1 (%) | Δ2 (%) | Δ3 (%) | r2/r1 | r3/r1 | DISPERSION COMPENSATION RATE (%) at 1600 nm |
|---|---|---|---|---|---|---|---|
| 1 | 6.36 | 1.60 | -0.86 | 0.34 | 3.0 | 4.0 | 100 |
| 2 | 6.88 | 1.52 | -0.90 | 0.28 | 2.4 | 4.2 | 100 |
| 3 | 6.93 | 1.60 | -0.98 | 0.28 | 3.0 | 4.2 | 99 |
| 4 | 7.11 | 1.60 | -0.92 | 0.34 | 2.6 | 4.6 | 105 |
| 5 | 7.29 | 1.54 | -0.96 | 0.26 | 2.4 | 4.6 | 99 |
| 6 | 7.58 | 1.56 | -0.88 | 0.30 | 2.4 | 4.2 | 100 |
| 7 | 8.14 | 1.06 | -0.98 | 0.18 | 1.8 | 3.6 | 102 |
| 8 | 8.95 | 1.02 | -0.96 | 0.16 | 1.8 | 4.0 | 100 |
| 9 | 9.28 | 1.00 | -0.96 | 0.18 | 1.8 | 4.2 | 86 |

FIG. 14B

| | TRANSMISSION LOSS (dB/km) at 1550 nm | CHROMATIC DISPERSION (ps/nm/km) at 1550 nm | DISPERSION SLOPE (ps/nm²/km) at 1550 nm | 2mλc (μm) | EFFECTIVE AREA (μm²) at 1550 nm | BENDING LOSS (dB/m) at 1550 nm |
|---|---|---|---|---|---|---|
| 1 | 0.320 | −49.7 | −0.41 | 1.27 | 20.2 | 20.0 |
| 2 | 0.318 | −61.7 | −0.46 | 1.49 | 21.7 | 17.3 |
| 3 | 0.324 | −21.3 | −0.17 | 1.20 | 18.8 | 0.7 |
| 4 | 0.352 | −11.8 | −0.09 | 1.46 | 15.0 | 0.0 |
| 5 | 0.398 | −108.7 | −0.89 | 1.10 | 13.7 | 14.4 |
| 6 | 0.398 | −59.0 | −0.48 | 1.47 | 12.6 | 0.1 |
| 7 | 0.401 | −48.2 | −0.40 | 1.23 | 11.5 | 0.4 |
| 8 | 0.404 | −190.7 | −1.44 | 1.49 | 16.1 | 20.9 |
| 9 | 0.400 | −174.2 | −1.42 | 1.35 | 15.3 | 33.9 |

FIG. 14C

| | RATIO OF LENGTHS OF DISPERSION-SHIFTED FIBER AND DISPERSION-COMPENSATING FIBER | COMPENSATION WAVELENGTH RANGE (nm) | MAXIMUM ABSOLUTE VALUE OF RESIDUAL DISPERSION IN COMPENSATION WAVELENGTH RANGE (ps/nm/km) |
|---|---|---|---|
| 1 | 5.1 : 1 | 1530~1570 | 0.08 |
| 2 | 6.3 : 1 | 1530~1570 | 0.16 |
| 3 | 2.2 : 1 | 1530~1570 | 0.11 |
| 4 | 1.2 : 1 | 1530~1570 | 0.12 |
| 5 | 11.2 : 1 | 1530~1570 | 0.09 |
| 6 | 6.1 : 1 | 1530~1570 | 0.10 |
| 7 | 5.0 : 1 | 1530~1570 | 0.11 |
| 8 | 19.5 : 1 | 1530~1570 | 0.14 |
| 9 | 17.8 : 1 | 1530~1570 | 0.06 |

FIG. 15B

| | TRANSMISSION LOSS (dB/km) at 1600 nm | CHROMATIC DISPERSION (ps/nm/km) at 1600 nm | DISPERSION SLOPE (ps/nm²/km) at 1600 nm | 2mλc (μm) | EFFECTIVE AREA (μm²) at 1600 nm | BENDING LOSS (dB/m) at 1600 nm |
|---|---|---|---|---|---|---|
| 1 | 0.400 | -39.9 | -0.22 | 0.95 | 12.6 | 0.2 |
| 2 | 0.380 | -93.9 | -0.52 | 1.27 | 15.6 | 1.7 |
| 3 | 0.392 | -23.0 | -0.13 | 1.00 | 12.0 | 0.0 |
| 4 | 0.384 | -178.6 | -1.03 | 1.51 | 18.0 | 18.5 |
| 5 | 0.364 | -161.6 | -0.88 | 1.37 | 18.2 | 32.0 |
| 6 | 0.384 | -22.5 | -0.12 | 1.47 | 13.6 | 0.0 |
| 7 | 0.324 | -22.4 | -0.13 | 1.22 | 20.6 | 0.1 |
| 8 | 0.326 | -36.1 | -0.20 | 1.31 | 22.1 | 2.3 |
| 9 | 0.334 | -60.8 | -0.29 | 1.52 | 25.4 | 18.0 |

FIG. 15C

| | RATIO OF LENGTHS OF DISPERSION-SHIFTED FIBER AND DISPERSION-COMPENSATING FIBER | COMPENSATION WAVELENGTH RANGE (nm) | MAXIMUM ABSOLUTE VALUE OF RESIDUAL DISPERSION IN COMPENSATION WAVELENGTH RANGE (ps/nm/km) |
|---|---|---|---|
| 1 | 3.0 : 1 | 1570~1630 | 0.16 |
| 2 | 6.8 : 1 | 1570~1630 | 0.08 |
| 3 | 1.7 : 1 | 1570~1630 | 0.15 |
| 4 | 12.8 : 1 | 1570~1630 | 0.11 |
| 5 | 11.6 : 1 | 1570~1630 | 0.05 |
| 6 | 1.6 : 1 | 1570~1630 | 0.09 |
| 7 | 1.7 : 1 | 1570~1630 | 0.06 |
| 8 | 2.6 : 1 | 1570~1630 | 0.07 |
| 9 | 4.4 : 1 | 1570~1630 | 0.30 |

WAVELENGTH DIVISION MULTIPLEXED TRANSMISSION PATH AND DISPERSION-COMPENSATING FIBER USED THEREIN

BACKGROUND OF THE INVENTION

1. Field of the Invention

The present invention relates to a wavelength division multiplexed (WDM) transmission path which links a dispersion-shifted fiber with a dispersion-compensating fiber.

2. Description of the Related Art

The lowest transmission loss in a quartz-type optical fiber is at wavelengths near to 1550 nm, and this wavelength band is conventionally used in long distance transmissions. Generally, a dispersion-shifted fiber with chromatic dispersion having a low absolute value in the 1550 nm band is used as the transmission path in this case. With the recent demand for large-capacity optical communications, there has appeared an optical communication system which uses high-power signal light, obtained by WDM signals and using an optical amplifier.

On the other hand, when the chromatic dispersion value of the optical fiber in the used waveband reaches zero, four-wave mixing, which is one type of nonlinear optical effect, is liable to occur; this is not desirable in WDM transmission. For this reason, a dispersion-shifted fiber having a zero-dispersion wavelength near 1550 nm is not suitable for use in WDM transmission in a waveband centered on 1550 nm.

Accordingly, an NZDSF (non-zero dispersion-shifted fiber) having zero-dispersion wavelength near 1520 nm, or near 1580 nm, has been developed.

Furthermore, a standard single mode optical fiber having zero-dispersion wavelength near 1300 nm has been widely used conventionally, and there have been proposals to a WDM transmission path which links this standard single mode optical fiber with the dispersion-compensating fiber. For example, Japanese Unexamined Patent Application, First Publication No. Hei 10-319266 discloses a hybrid optical fiber link in which, by linking the standard single mode optical fiber with the dispersion-compensating fiber, in a waveband of 1500 nm to 1600 nm, positive chromatic dispersion (accumulated dispersion) of the standard single mode optical fiber is cancelled by the negative chromatic dispersion of the dispersion-compensating fiber, whereby the dispersion of the entire transmission path is almost zero.

Furthermore, given the demand for even larger capacity optical communication, there have been announcements of investigations of not only the waveband of near 1530 nm to 1570 nm used in conventional optical communication systems, but also wavebands such as 1570 nm to 1630 nm and 1460 nm to 1530 nm. These wavebands, which are currently in use and under consideration, are generally termed S-band (1460 nm to 1530 nm), C-band (1530 nm to 1570 nm), and L-band (1570 nm to 1630 nm).

However, since the conventional NZDSF has a zero dispersion wavelength near to 1520 nm or 1580 nm, noise is liable to be generated by four-wave mixing in these wavebands. Therefore, the NZDSF has a drawback of not being suitable for WDM transmission in the S-band and L-band.

Although the zero dispersion wavelength of the standard single mode optical fiber is not within any of the S-band, C-band, and L-band, the standard single mode optical fiber has high chromatic dispersion in these wavebands, and, due to the effect of accumulated dispersion (i.e. residual dispersion) when transmitting optical signals over long distances, has a drawback of waveform deterioration caused by interference between adjacent signals. There is a further drawback of restrictions on the transmission distance in the L-band, where residual chromatic dispersion is high.

For the reasons given above, there has still not been disclosed a WDM transmission path which can select any waveband from the wide wavebands represented by S-band, C-band, and L-band.

SUMMARY OF THE INVENTION

This invention has been realized in view of the above circumstances, and aims to construct a WDM transmission path in which it is possible to select any waveband from the widest possible wavebands represented by S-band, C-band, and L-band.

More preferably, it is an object of this invention to provide the WDM transmission path having desirable characteristics in the S-band, C-band, and L-band.

Specifically, it is an object of this invention to provide a large-capacity WDM transmission path which is capable of high-speed optical communication, by constructing the WDM transmission path wherein, in a used waveband which has been selected from a wide waveband comprising the S-band, C-band, and L-band, or more preferably, in a waveband comprising all of the S-band, C-band, and L-band, the chromatic dispersion in the used waveband does not reach zero and the residual chromatic dispersion of the entire WDM transmission path is low so that four-wave mixing does not occur.

The WDM transmission path of this invention has a dispersion-compensating transmission path comprising a dispersion-shifted fiber, and one type of dispersion-compensating fiber, or two or more types of dispersion-compensating fiber having different chromatic dispersion, wherein the dispersion-shifted fiber comprising a) a central core segment, a peripheral core segment, provided on the outer periphery of the central core segment, and a clad, provided on the outer periphery of the peripheral core segment, the refractive index profile of the dispersion-shifted fiber being such that the peripheral core segment has a higher refractive index than the central core segment, and the clad has a lower refractive index than the peripheral core segment, the dispersion-shifted fiber having positive chromatic dispersion in a waveband of 1460 nm to 1630 nm; the dispersion-compensating fiber comprising b) a central core segment, an intermediate core segment, provided on the outer periphery of the central core segment, a ring core segment, provided on the outer periphery of the intermediate core segment, and a clad, provided on the outer periphery of the ring core segment; the refractive index profile of the dispersion-compensating fiber being such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber having negative chromatic dispersion in the compensation waveband of the dispersion-compensating fiber, selected from 1460 nm to 1630 nm; and the residual chromatic dispersion of the WDM transmission path being greater than or equal to −1.0 ps/nm/km and less than or equal to +1.0 ps/nm/km in a used waveband of the WDM transmission path, which is selected from 1460 nm to 1630 nm.

Furthermore, a dispersion-compensating fiber of this invention is provided with a central core segment; an intermediate core segment, provided on the outer periphery of the central core segment; a ring core segment, provided on the outer periphery of the intermediate core segment; and a clad, provided on the outer periphery of the ring core segment, wherein the refractive index profile of the dispersion-compensating fiber being such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment; the dispersion-compensating fiber having negative chromatic dispersion in the compensation waveband of the dispersion-compensating fiber, selected from 1460 nm to 1630 nm; and, when linked with a dispersion-shifted fiber having positive chromatic dispersion in the waveband of 1460 nm to 1630 nm to form a WDM transmission path, the residual chromatic dispersion of the WDM transmission path being greater than or equal to −1.0 ps/nm/km and less than or equal to +1.0 ps/nm/km in a used waveband of the WDM transmission path, selected from 1460 nm to 1630 nm.

In the WDM transmission path of this invention and the dispersion-compensating fiber used therein, by constructing the WDM transmission path so that the chromatic dispersion does not reach zero in short segments of the used waveband, and the residual chromatic dispersion of the entire transmission path is low, it becomes possible to select a used waveband from a wide waveband comprising the S-band, C-band, and L-band.

Furthermore, it is possible to provide the WDM transmission path having desirable characteristics in the entire band comprising the S-band, C-band, and L-band. As a result, a large-capacity WDM transmission path which is capable of high-speed communication can be provided.

BRIEF DESCRIPTION OF THE DRAWINGS

FIG. 4A is a diagram showing structural parameters of a dispersion-shifted fiber used in the experimental example 1;

FIG. 4B is a diagram showing optical characteristics of the dispersion-shifted fiber used in the experimental example 1;

FIG. 5A is a diagram showing structural parameters of a dispersion-compensating fiber for S-band used in the experimental example 1;

FIG. 5B is a diagram showing optical characteristics of the dispersion-compensating fiber for S-band used in the experimental example 1;

FIG. 6A is a diagram showing structural parameters of a dispersion-compensating fiber for C-band used in the experimental example 1;

FIG. 6B is a diagram showing optical characteristics of the dispersion-compensating fiber for C-band used in the experimental example 1;

FIG. 7A is a diagram showing structural parameters of a dispersion-compensating fiber for L-band used in the experimental example 1;

FIG. 7B is a diagram showing optical characteristics of the dispersion-compensating fiber for L-band used in the experimental example 1;

FIG. 9A is a diagram showing structural parameters of a dispersion-compensating fiber used in the experimental example 2;

FIG. 9B is a diagram showing optical characteristics of the dispersion-compensating fiber used in the experimental example 2;

FIG. 11A is a diagram showing structural parameters of a dispersion-compensating fiber used in the experimental example 3;

FIG. 11B is a diagram showing optical characteristics of a dispersion-compensating fiber used in the experimental example 3;

FIG. 11C is a diagram showing the length ratio, compensation wavelength range, and maximum absolute value of residual chromatic dispersion in the compensation wavelength range, in a case where dispersion-shifted fibers similar to those in the experimental examples 1 and 2 are linked in the experimental example 3;

FIG. 12A is a diagram showing structural parameters of a dispersion-compensating fiber used in the experimental example 4;

FIG. 12B is a diagram showing optical characteristics of the dispersion-compensating fiber used in the experimental example 4;

FIG. 14A is a diagram showing structural parameters of a dispersion-compensating fiber used in the experimental example 5;

FIG. 14B is a diagram showing optical characteristics of a dispersion-compensating fiber used in the experimental example 5;

FIG. 14C is a diagram showing the length ratio, compensation wavelength range, and maximum absolute value of residual chromatic dispersion in the compensation wavelength range, in a case where dispersion-shifted fibers similar to those in the experimental examples 1 to 4 are linked in the experimental example 5;

FIG. 15A is a diagram showing structural parameters of a dispersion-compensating fiber used in the experimental example 6;

FIG. 15B is a diagram showing optical characteristics of a dispersion-compensating fiber used in the experimental example 6;

FIG. 15C is a diagram showing the length ratio, compensation wavelength range, and maximum absolute value of residual chromatic dispersion in the compensation wavelength range, in a case where dispersion-shifted fibers similar to those in the experimental examples 1 to 5 are linked in the experimental example 6;

DETAILED DESCRIPTION OF THE PREFERRED EMBODIMENTS

Figure 1:
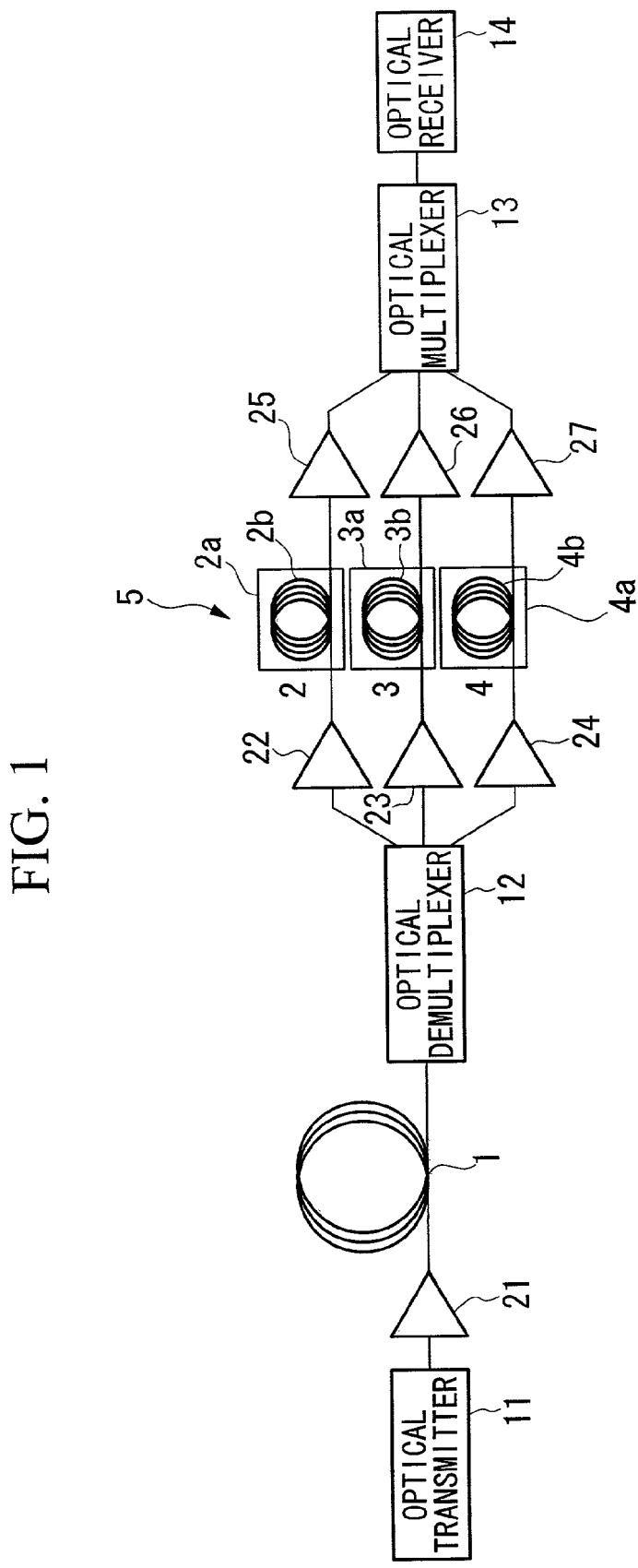
FIG. 1 is a schematic diagram showing one example of the constitution of a WDM transmission path according to an embodiment of the present invention.

FIG. 1 is a schematic diagram showing one example of the constitution of a WDM transmission path according to an embodiment of the present invention. In FIG. 1, reference numeral 11 represents an optical transmitter, and the input terminal of a dispersion-shifted fiber 1 is connected to the output of the optical transmitter 11. An optical demultiplexer 12 is provided at the output terminal of the dispersion-shifted fiber 1. The optical demultiplexer 12 demultiplexes an optical signal, input from the dispersion-shifted fiber 1, into wavebands of three optical signals in the S-band, the C-band, and the L-band, and a first dispersion-compensating module 2, a second dispersion-compensating module 3, and a third dispersion-compensating module 4 are respectively provided at the three output sections of the optical demultiplexer 12.

The first dispersion-compensating module 2, second dispersion-compensating module 3, and third dispersion-compensating module 4 form a dispersion-compensating transmission path 5 which compensates the accumulated dispersion, accumulated when transmitting along the dispersion-shifted fiber 1.

The first dispersion-compensating module 2 compensates the accumulated dispersion of the S-band optical signal, transmitted along the dispersion-shifted fiber 1.

The second dispersion-compensating module 3 compensates the accumulated dispersion of the C-band optical signal, transmitted along the dispersion-shifted fiber 1.

The third dispersion-compensating module 4 compensates the accumulated dispersion of the L-band optical signal, transmitted along the dispersion-shifted fiber 1.

The first dispersion-compensating module 2 comprises, for example, a dispersion-compensating fiber 2b which is wound and accommodated inside a case 2a, both ends thereof being extracted from holes provided in the case 2a. Alternatively, appropriate lead fibers are connected to both ends of the dispersion-compensating fiber 2b, and these lead fibers can be extracted to the outside of the case 2a. The lead fibers should preferably comprise dispersion-shifted fibers which are suitable for use in the embodiment of this invention.

The second dispersion-compensating module 3 and third dispersion-compensating module 4 have similar constitutions, and comprise dispersion-compensating optical fibers 3b and 4b which are wound and accommodated inside cases 3a and 4a respectively.

The output terminals of the first dispersion-compensating module 2, second dispersion-compensating module 3, and third dispersion-compensating module 4 are connected to an optical multiplexer 13; an optical receiver 14 is provided on the output side of the optical multiplexer 13.

An optical amplifier 21 is provided midway along the dispersion-shifted fiber 1, and one each of optical amplifiers 22 to 27 is provided on the input side and output side of the first dispersion-compensating module 2, the second dispersion-compensating module 3, and the third dispersion-compensating module 4 respectively.

Incidentally, optical fiber wires or coated optical fibers, comprising a plastic coated region provided on a bare optical fiber of quartz-type glass, may be used as the dispersion-shifted fiber 1 and the dispersion-compensating fibers 2b, 3b, and 4b.

In this WDM transmission path, an optical signal in the used waveband of the WDM transmission path is output from the optical transmitted 11, amplified by the optical amplifier 21, transmitted along the dispersion-shifted fiber 1, demultiplexed by the optical demultiplexer 12 into each waveband to the first dispersion-compensating module 2, the second dispersion-compensating module 3, and the third dispersion-compensating module 4, and amplified by each of the optical amplifiers 22 to 27.

The first dispersion-compensating module 2 compensates accumulated dispersion of the S-band optical signal, accumulated when transmitted along the dispersion-shifted fiber 1; the second dispersion-compensating module 3 compensates accumulated dispersion of the C-band optical signal, accumulated when transmitted along the dispersion-shifted fiber 1; and the third dispersion-compensating module 4 compensates accumulated dispersion of the L-band optical signal, accumulated when transmitted along the dispersion-shifted fiber 1.

Thereafter, the optical signals are multiplexed via the optical multiplexer 13 and received at the optical receiver 14.

The used waveband of the WDM transmission path can be selected from a range of wavelengths of 1460 nm to 1630 nm.

Depending on the used waveband, the WDM transmission path can be constructed by using only one type or two types of the first dispersion-compensating module 2, second dispersion-compensating module 3, and third dispersion-compensating module 4.

The dispersion-shifted fiber 1 satisfies the aforementioned conditions of a).

Figure 2:
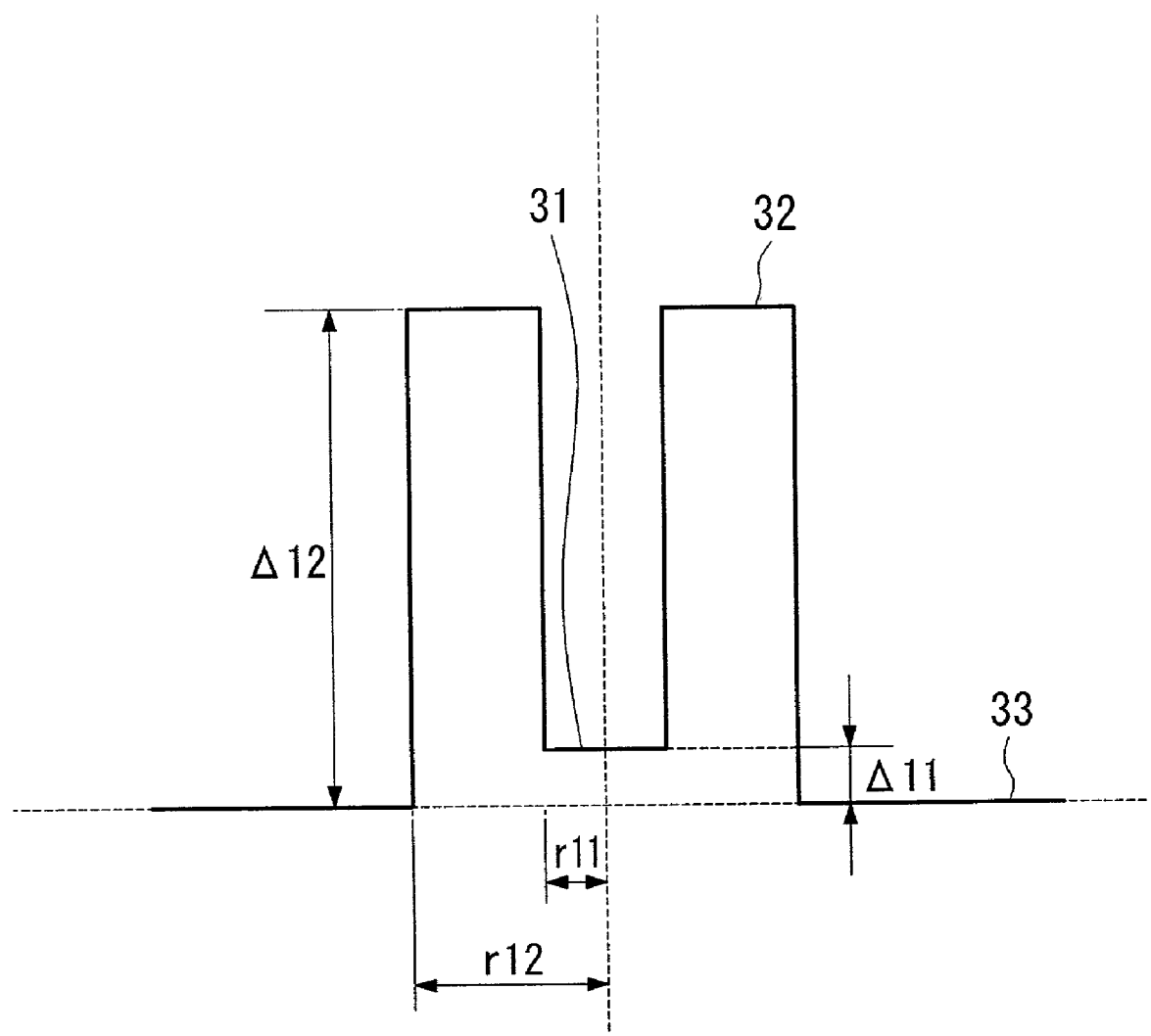
FIG. 2 is a diagram showing one example of the refractive index profile of a dispersion-shifted fiber used in WDM transmission according to an embodiment of this invention.

FIG. 2 shows an example of the refractive index profile of the dispersion-shifted fiber 1. The refractive index profile comprises a central core segment 31, a peripheral core segment 32, provided on the outer periphery of the central core segment 31 and having a higher refractive index than the central core segment 31, and a clad 33, provided on the outer periphery of the peripheral core segment 32 and having a lower refractive index than the peripheral core segment 32. Provided that the actual shape of the refractive index profile is basically that shown in FIG. 2, the steps of the interfaces between the regions need not be clear, as shown in FIG. 2, but may be gentle curves instead.

In this example, the central core segment 31 and the peripheral core segment 32 comprise germanium-doped quartz glass, and the clad 33 comprises pure quartz glass or fluorine-doped quartz glass, and the like.

The dispersion-shifted fiber having this refractive index profile can be manufactured by using a conventional method such as VAD, MCVD, and PCVD.

In the dispersion-shifted fiber 1 having this refractive index profile, positive chromatic dispersion can be achieved in the entire range of wavelengths from 1460 nm to 1630 nm by appropriately setting the structural parameters of the refractive index profile. The range of positive chromatic dispersion in the entire range of wavelengths from 1460 nm to 1630 nm of the dispersion-shifted fiber is +1.0 to +18.0 ps/nm/km, and preferably +2.0 to +16.0 ps/nm/km.

More specifically, the dispersion-shifted fiber should preferably satisfy the following conditions.

c) at a wavelength of 1550 nm, the chromatic dispersion is greater than or equal to +6 ps/nm/km and less than or equal to +10 ps/nm/km.

d) at a wavelength of 1550 nm, the dispersion slope is less than or equal to +0.09 ps/nm$^2$/km, and preferably less than or equal to 0.08 ps/nm$^2$/km. While there are no restrictions on the minimum value, the dispersion slope is actually greater than or equal to +0.05 ps/nm$^2$/km.

e) at a wavelength of 1550 nm, the effective area is greater than or equal to 80 μm$^2$, less than or equal to 120 μm$^2$, and preferably greater than or equal to 120 μm$^2$ and less than or equal to 120 μm$^2$.

In d), when the dispersion slope exceeds +0.09 ps/nm$^2$/km, in the used waveband, there is a danger that it will become difficult for the dispersion-shifted fiber to compensate the dispersion slope.

In e), when the effective area is below 80 μm$^2$, nonlinear optical effects are liable to occur and the transmission characteristics may deteriorate. A dispersion-shifted fiber having an effective area exceeding 120 μm$^2$ cannot practically be manufactured.

Furthermore, the dispersion-shifted fiber should preferably satisfy the following condition.

f) The dispersion-shifted fiber can achieve single mode transmission in a waveband of 1460 nm to 1630 nm.

Even if the cut-off wavelength measured by using the method stipulated in ITU-T standard G.650 is longer than 1460 nm, single mode transmission becomes possible in the form of actual optical fibers. Therefore, it is necessary only to provide the cut-off wavelength which allows single mode transmission under the actual conditions of use. Hereinafter, "actually capable of single mode transmission" denotes the characteristics of actual conditions of use in the used waveband as described above.

To satisfy the characteristics of c) to e), and more preferably c) to f), when r11 represents the radius of the central core segment 31, r12 represents the radius of the peripheral core segment 32, Δ11 represents the relative refractive index difference of the central core segment 31 using the clad 33 as a reference, and Δ12 represents the relative refractive index difference of the peripheral core segment 32 using the clad 33 as a reference, structural parameters should preferably satisfy the following conditions (1) to (4).

$$-0.1\% \leq \Delta 11 \leq 0.1\% \tag{1}$$

$$0.7\% \leq \Delta 12 \leq 1.2\% \tag{2}$$

$$3.0 \; \mu m \leq r11 \leq 5.0 \; \mu m \tag{3}$$

$$1.2 \leq r12/r11 \leq 2.0 \tag{4}$$

When $n_{11}$ represents the refractive index of the central core segment 31, $n_{12}$ represents the refractive index of the peripheral core segment 32, and $n_{clad}$ represents the refractive index of the clad 33, the relative refractive index differences Δ11 and Δ12 are defined by the following equations respectively.

$$\Delta 11 = (n_{11}^2 - n_{clad}^2)/2n_{11} \approx (n_{11} - n_{clad})/n_{11} \approx (n_{11} - n_{clad})/n_{clad}$$

$$\Delta 12 = (n_{12}^2 - n_{clad}^2)/2n_{12} \approx (n_{12} - n_{clad})/n_{12}(n_{12} - n_{clad})/n_{clad}$$

Even with a combination of structural parameters which satisfy the conditions of (1) to (4), the dispersion-shifted fiber will not necessarily achieve the desired characteristics. Accordingly, simulation and the like is performed to select an appropriate combination of r11, r12, Δ11 and Δ12 from structural parameters which satisfy the conditions of (1) to (4), thereby achieving the dispersion-shifted fiber having the characteristics of c) to e), and preferably c) to f).

Since the dispersion-shifted fiber does not have a zero dispersion wavelength in any of the S-band, C-band, and L-band due to the aforementioned condition a), there is no four-wave mixing, and the dispersion-shifted fiber is suitable for WDM transmission. Since the chromatic dispersion value is not very high, there is little waveform deterioration; since the effective area is large, the nonlinear optical effects can be reduced.

However, when this dispersion-shifted fiber is used on its own, the waveform deteriorates as a result of the accumulation of accumulated dispersion during long-distance transmission.

Accordingly, the first dispersion-compensating module 2, second dispersion-compensating module 3, and third dispersion-compensating module 4 shown in FIG. 1 compensate accumulated dispersion in the S-band, C-band, and L-band respectively.

The dispersion-compensating fibers 2b, 3b, and 4b, used in the first dispersion-compensating module 2, second dispersion-compensating module 3, and third dispersion-compensating module 4, each have different chromatic dispersion and dispersion slopes. That is, the wavebands which the chromatic dispersion of the dispersion-shifted fiber 1 can be appropriately compensated at are different. Each of the optical fibers satisfies the aforementioned conditions of b).

Figure 3:
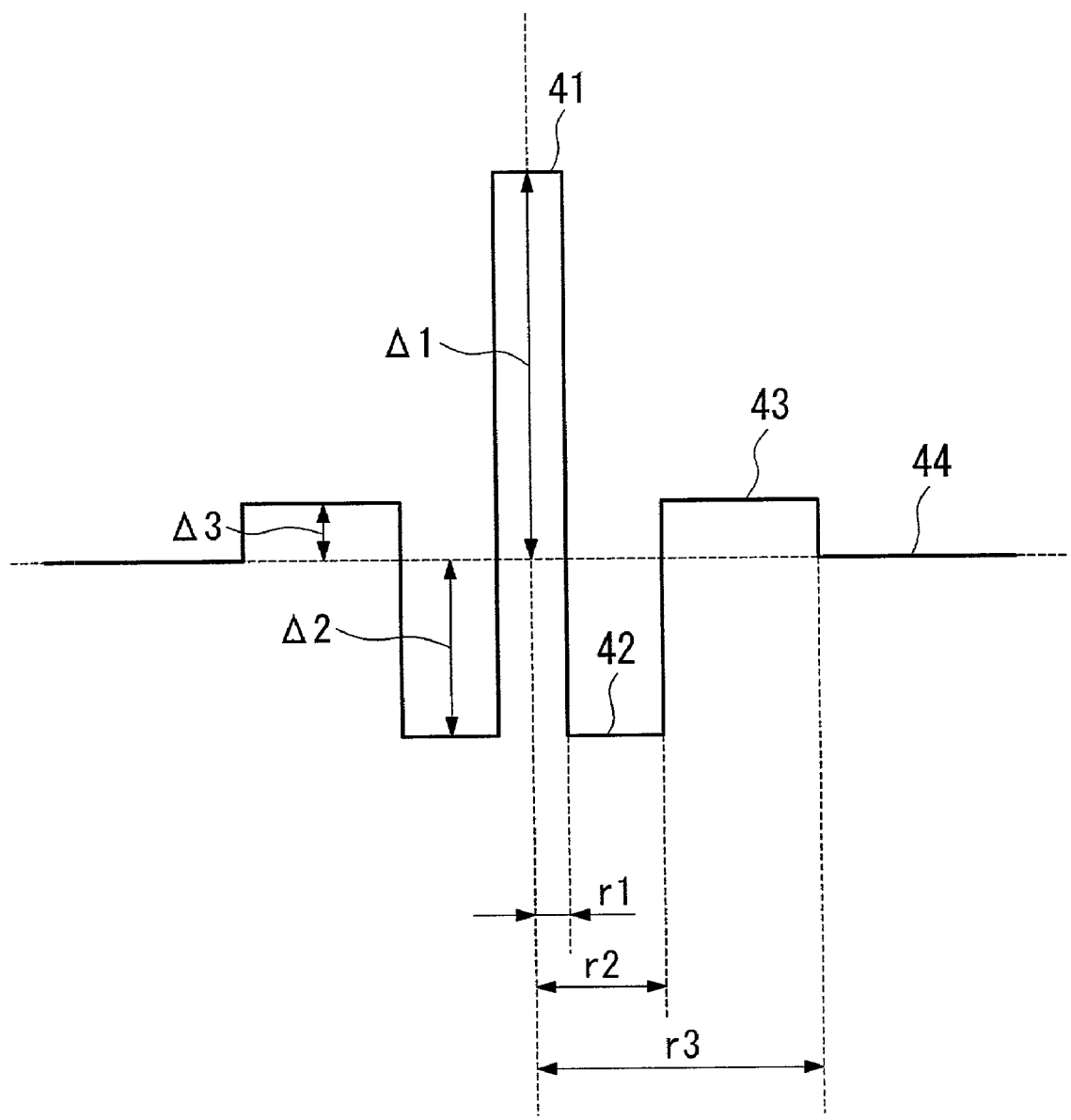
FIG. 3 is a diagram showing one example of the refractive index profile of a dispersion-compensating fiber used in WDM transmission according to an embodiment of this invention.

FIG. 3 shows an example of the preferred refractive index profiles of the dispersion-compensating fibers 2b, 3b, and 4b. In this refractive index profile, when the structural parameters are set appropriately, the dispersion-compensating fiber 2b has negative chromatic dispersion in the S-band and achieves the desired characteristics for compensating accumulated dispersion of optical signals in the S-band.

The dispersion-compensating fiber 3b has negative chromatic dispersion in the C-band and achieves the desired characteristics for compensating accumulated dispersion of optical signals in the C-band.

The dispersion-compensating fiber 4b has negative chromatic dispersion in the L-band and achieves the desired characteristics for compensating accumulated dispersion of optical signals in the L-band.

The refractive index profile comprises a central core segment 41, an intermediate core segment 42, provided on the outer periphery of the central core segment 41 and having a lower refractive index than the central core segment 41, a ring core segment 43, provided on the outer periphery of the intermediate core segment 42 and having a refractive index which is higher than that of the intermediate core segment 42 but lower than that of the central core segment 41, and a clad 44, provided on the outer periphery of the ring core segment 43 and having a refractive index which is lower than that of the ring core segment 43 but higher than that of the intermediate core segment 42. Provided that the actual shape of the refractive index profile is basically that shown in FIG. 3, the steps of the interfaces between the regions need not be clear, as shown in FIG. 3, but may be gentle curves instead.

In this example, the central core segment 41 and the ring core segment 43 comprise, for example, germanium-doped quartz glass, the intermediate core segment 42 comprises pure quartz glass or fluorine-doped quartz glass, and the like, and the clad 44 comprises pure quartz glass or fluorine-doped quartz glass, and the like.

The dispersion-compensating fiber having this refractive index profile can be manufactured by using a conventional method such as VAD, MCVD, and PCVD.

In each of the dispersion-compensating fibers 2b, 3b, and 4b, it is preferable that the relative refractive index difference Δ1 of the central core segment 41 with respect to the clad 44 is greater than or equal to 1.0% and less than or equal to 1.7% the relative refractive index difference Δ2 of the intermediate core segment 42 with respect to the clad 44 is greater than or equal to −1.5% and less than or equal to 0.5% the relative refractive index difference Δ3 of the ring core segment 43 with respect to the clad 44 is greater than 0% and less than or equal to 0.6% the radius r3 of the ring core segment 43 is greater than or equal to 5 μm and less than or equal to 15 μm.

When the relative refractive index difference Δ1 is less than the minimum, the absolute value of the chromatic dispersion decreases, and consequently, the length of the dispersion-compensating fiber must be increased in order to compensate chromatic dispersion of the dispersion-shifted fiber; this adversely affects the transmission characteristics. When the relative refractive index difference Δ1 exceeds the maximum, the effective area may decrease and transmission loss may increase.

When the relative refractive index difference Δ2 is less than the minimum, transmission loss may increase; when the relative refractive index difference Δ12 exceeds the maximum, it may not be possible to obtain a dispersion slope which is sufficient to compensate the dispersion slope of the dispersion-shifted fiber.

That is, when the relative refractive index difference Δ3 exceeds the maximum, the cut-off wavelength becomes longer, and when the relative refractive index difference Δ3 is less than or equal to 0%, the effective area decreases.

When the radius r3 is less than the minimum, the effects of microbends tend to increase the loss; when the radius r3 exceeds the maximum, the cut-off wavelength may become longer.

Incidentally, in FIG. 3, r1 represents the radius of the central core segment 41, and r2 represents the radius of the intermediate core segment 42. There are no particular restrictions on the values of r1 and r2, which are adjusted as appropriate according to the characteristics value of the dispersion-compensating fiber, but in consideration of the dispersion compensation rate and bending loss, r2/r1 should preferably be between 2.0 and 3.0. In addition, in consideration of the cut-off wavelength and the effective area, r3/r1 should preferably be between 3.0 and 5.0.

When the refractive indices of the central core segment 41, the intermediate core segment 42, the ring core segment 43, and the clad 44 are expressed by $n_1$, $n_2$, $n_3$, and $n_{clad}$ respectively, the relative refractive indices Δ1, Δ2, and Δ3 are defined as follows.

$$\Delta 1 = (n_1^2 - n_{clad})/2n_1 \approx (n_1 - n_{clad})/n_1 \approx (n_1 - n_{clad})n_{clad}$$

$$\Delta 2 = (n_2^2 - n_{clad})/2n_2 \approx (n_2 - n_{clad})/n_2 \approx (n_2 - n_{clad})n_{clad}$$

$$\Delta 3 = (n_3^2 - n_{clad})/2n_3 \approx (n_3 - n_{clad})/n_3 \approx (n_3 - n_{clad})n_{clad}$$

Even with a selective combination of structural parameters which satisfy the aforementioned conditions, the preferred characteristics of the dispersion-compensating fiber according to the embodiment of this invention will not necessarily be obtained. Accordingly, simulation and the like is performed to select an appropriate combination of r1, r2, r3, Δ1, Δ2, and Δ3 from the structural parameters which satisfy the aforementioned conditions, thereby achieving the preferred characteristics of the dispersion-compensating fiber according to the embodiment of this invention.

Subsequently, the preferred dispersion-compensating fiber characteristics of the dispersion-compensating fiber 2b for compensating in the S-band, the dispersion-compensating fiber 3b for compensating in the C-band, and the dispersion-compensating fiber 4b for compensating in the L-band, will be explained.

In view of the general frequency of their use, these will be explained in the order of C-band, L-band, and S-band.

Dispersion-Compensating Fiber for Compensating C-band

This dispersion-compensating fiber corresponds to the claimed dispersion-compensating fiber (A).

The dispersion-compensating fiber (A) is actually capable of single mode transmission at a wavelength of 1530 nm. For this reason, single mode transmission is possible in the C-band and wavebands which are longer than the C-band.

When the dispersion-compensating fiber (A) compensates a dispersion-shifted fiber satisfying the conditions of c) to e), the dispersion compensation rate is greater than or equal to 80% and less than or equal to 120%, and more preferably greater than or equal to 90% and less than or equal to 110%, when the dispersion compensation rate is defined by (Sc1/Dc1)/(Ss1/Ds1)

where Dc1 and Sc1 respectively represent the chromatic dispersion and dispersion slope of the dispersion-compensating fiber (A) at the center wavelength of the compensation waveband, selected from wavelengths from 1530 nm to 1570 nm, and Ds1 and Ss1 respectively represent the chromatic dispersion and dispersion slope of the compensated dispersion-shifted fiber at the center wavelength of the compensation waveband of the dispersion-compensating fiber (A).

The compensation waveband of the dispersion-compensating fiber (A) is defined as the waveband of optical signals which the dispersion-compensating fiber (A) compensates under conditions of actual use. In this example, the compensation waveband of the dispersion-compensating fiber (A) is part, or more preferably all, of the C-band, i.e. 1530 nm to 1570 nm. When the compensation waveband is all of the C-band, the center wavelength is 1550 nm.

The dispersion-compensating fiber (A) has negative dispersion throughout its entire compensation waveband. The range of chromatic dispersion in the compensation waveband is −120 to −20 ps/nm/km, and preferably −90 to −25 ps/nm/km. It is not possible to obtain the dispersion compensation rate defined above outside this range, and there is a danger that it will become impossible to sufficiently compensate the chromatic dispersion of the dispersion-shifted fiber 1, or that the length of the dispersion-compensating fiber (A) needed to compensate the chromatic dispersion of the dispersion-shifted fiber 1 will increase, consequently increasing the overall transmission loss of the entire transmission path.

When the dispersion compensation rate satisfies the above range, the chromatic dispersion and dispersion slope of the dispersion-shifted fiber can be sufficiently compensated in the C-band.

The higher the absolute values of the chromatic dispersion and dispersion slope of the dispersion-compensating fiber, the shorter its length (in proportion to the length of the dispersion-shifted fiber) which can compensate the chromatic dispersion and dispersion slope of the dispersion-shifted fiber. However, when the absolute values of the chromatic dispersion and dispersion slope are too high, there are difficulties in manufacturing the dispersion-compensating fiber, and the transmission loss will increase.

Accordingly, to sufficiently compensate the chromatic dispersion and dispersion slope of the dispersion-shifted fiber which satisfies the conditions of c) to e) mentioned above, while giving due consideration to manufacture and transmission loss, the dispersion-compensating fiber (A) should have a dispersion slope at 1550 nm of greater than or equal to −1.0 ps/nm²/km, and less than or equal to −0.3 ps/nm²/km, and more preferably greater than or equal to −0.55 ps/nm²/km and less than or equal to −0.4 ps/nm²/km.

The higher the difference in the effective area between the dispersion-compensating fiber and the dispersion-shifted fiber, the higher the transmission loss. In addition, in view of suppression of nonlinear optical effect, it is preferable that the effective area is large.

When the bending loss increases, the transmission characteristics are liable to deteriorate as a result of bends caused during manufacture, installation, and inside the module.

Accordingly, at the center wavelength of the compensation waveband of the dispersion-compensating fiber (A), it is preferable that the effective area and bending loss satisfy the following conditions.

The effective area (Aeff) defined below should be greater than or equal to 12 μm², and preferably greater than or equal to 18 μm². Although there are no particular restrictions on the maximum value of the effective area, a dispersion-compensating fiber having an effective area of below or equal to 22 μm² can practically be manufactured.

$$Aeff = \frac{2\pi \left\{ \int_0^\infty r|E(r)|^2 \, dr \right\}^2}{\int_0^\infty r|E(r)|^4 \, dr}$$

Here, r represents the core radius, and E(r) represents the electromagnetic intensity at the radius r.

The bending loss of a bend diameter of 20 mm should be less than or equal to 30 dB/m, and preferably less than or equal to 20 dB/m. The smaller the bending loss the better, and therefore there are no restrictions on the minimum value.

The effective area should be greater than or equal to 12 μm² and the bending loss should be less than or equal to 30 dB/m; more preferably, the effective area should be greater than or equal to 18 μm² and the bending loss should be less than or equal to 20 dB/m.

Dispersion-Compensating Fiber for Compensating L-Band

This dispersion-compensating fiber corresponds to the claimed dispersion-compensating fiber (B).

The dispersion-compensating fiber (B) is actually capable of single mode transmission at a wavelength of 1570 nm. For this reason, single mode transmission is possible in the L-band and longer wavebands.

When the dispersion-compensating fiber (B) compensates a dispersion-shifted fiber satisfying the conditions of c) to e), the dispersion compensation rate should preferably be greater than or equal to 80% and less than or equal to 120%, the dispersion compensation rate being defined by (Sc2/Dc2)/(Ss2/Ds2)

where Dc2 and Sc2 respectively represent the chromatic dispersion and dispersion slope of the dispersion-compensating fiber (B) at the center wavelength of the compensation waveband, selected from wavelengths from 1570 nm to 1630 nm, and Ds2 and Ss2 respectively represent the chromatic dispersion and dispersion slope of the compensated dispersion-shifted fiber at the center wavelength of the compensation waveband of the dispersion-compensating fiber (B).

The compensation waveband of the dispersion-compensating fiber (B) is defined as the waveband of optical signals which the dispersion-compensating fiber (B) compensates under conditions of actual use. In this example, the compensation waveband of the dispersion-compensating fiber (B) is part, or more preferably all, of the L-band, i.e. 1570 nm to 1630 nm. When the compensation waveband comprises all of the L-band, the center wavelength is 1600 nm.

The dispersion-compensating fiber (B) has negative dispersion throughout its entire compensation waveband. The range of chromatic dispersion in the compensation waveband is −200 to −60 ps/nm/km, and preferably −170 to −80 ps/nm/km. It is not possible to obtain the dispersion compensation rate defined above outside this range, and there is a danger that it will become impossible to sufficiently compensate the chromatic dispersion of the dispersion-shifted fiber 1, or that the length of the dispersion-compensating fiber (B) needed to compensate the chromatic dispersion of the dispersion-shifted fiber 1 will increase, consequently increasing the overall transmission loss of the entire transmission path.

When the dispersion compensation rate satisfies the above range, the chromatic dispersion and dispersion slope of the dispersion-shifted fiber can be sufficiently compensated in the L-band.

For the same reasons as in the case of the dispersion-compensating fiber (A), the dispersion-compensating fiber (B) should have a dispersion slope at 1550 nm of greater than or equal to −1.0 ps/nm²/km, and less than or equal to −0.3 ps/nm²/km, and more preferably greater than or equal to −0.6 ps/nm²/km and less than or equal to −0.45 ps/nm²/km.

Furthermore, for the same reasons as in the case of the dispersion-compensating fiber (A), it is preferable that the effective area and bending loss at the center wavelength of the compensation waveband of the dispersion-compensating fiber (B) satisfy the following conditions.

That is, the effective area should be greater than or equal to 12 μm², and preferably greater than or equal to 18 μm². There are no particular restrictions on the maximum value of the effective area, but in consideration of manufacturing, the effective area is less than or equal to 25 μm².

The bending loss of a bend diameter of 20 mm should be less than or equal to 30 dB/m, and preferably less than 20 dB/m. The smaller the bending loss the better, and therefore there are no restrictions on the minimum value.

The effective area should be greater than or equal to 12 μm² and the bending loss should be less than or equal to 30 dB/m; more preferably, the effective area should be greater than or equal to 18 μm² and the bending loss should be less than or equal to 20 dB/m.

Dispersion-Compensating Fiber for Compensating S-Band

This dispersion-compensating fiber corresponds to the claimed dispersion-compensating fiber (C).

The dispersion-compensating fiber (C) is actually capable of single mode transmission at a wavelength of 1460 nm. For this reason, single mode transmission is possible in the S-band and longer wavebands.

When the dispersion-compensating fiber (C) compensates a dispersion-shifted fiber satisfying the conditions of c) to e), the dispersion compensation rate should preferably be greater than or equal to 80% and less than or equal to 120%, the dispersion compensation rate being defined by $$(Sc3/Dc3)/(Ss3/Ds3)$$

where Dc3 and Sc3 respectively represent the chromatic dispersion and dispersion slope of the dispersion-compensating fiber (C) at the center wavelength of the compensation waveband, selected from wavelengths from 1460 nm to 1530 nm, and Ds3 and Ss3 respectively represent the chromatic dispersion and dispersion slope of the compensated dispersion-shifted fiber at the center wavelength of the compensation waveband of the dispersion-compensating fiber (C).

The compensation waveband of the dispersion-compensating fiber (C) is defined as the waveband of optical signals which the dispersion-compensating fiber (C) compensates under conditions of actual use. In this example, the compensation waveband of the dispersion-compensating fiber (C) is part, or more preferably all, of the S-band, i.e. 1460 to 1530 nm. When the compensation waveband comprises all of the S-band, the center wavelength is 1495 nm.

The dispersion-compensating fiber (C) has negative dispersion throughout its entire compensation waveband. The range of chromatic dispersion in the compensation waveband is −150 to −4 ps/nm/km, and preferably −40 to −4 ps/nm/km. It is not possible to obtain the dispersion compensation rate defined above outside this range, and there is a danger that it will become impossible to sufficiently compensate the chromatic dispersion of the dispersion-shifted fiber 1, or that the length of the dispersion-compensating fiber (C) needed to compensate the chromatic dispersion of the dispersion-shifted fiber 1 will increase, consequently increasing the overall transmission loss of the entire transmission path.

When the dispersion compensation rate satisfies the above range, the chromatic dispersion and dispersion slope of the dispersion-shifted fiber can be sufficiently compensated in the S-band.

For the same reasons as in the case of the dispersion-compensating fiber (A), the dispersion-compensating fiber (C) should have a dispersion slope at 1550 nm of greater than or equal to −1.0 ps/nm²/km, and less than or equal to −0.3 ps/nm²/km, and more preferably greater than or equal to −0.5 ps/nm²/km and less than or equal to −0.3 ps/nm²/km.

Furthermore, for the same reasons as in the case of the dispersion-compensating fiber (A), it is preferable that the effective area and bending loss at the center wavelength of the compensation waveband of the dispersion-compensating fiber (C) satisfy the following conditions.

The effective area should be greater than or equal to 12 μm², and more preferably, greater than or equal to 18 μm². There are no particular restrictions on the maximum value of the effective area, but in consideration of manufacturing, the effective area is less than or equal to 21 μm².

The bending loss of a bend diameter of 20 mm should be less than or equal to 30 dB/m, and preferably less than or equal to 20 dB/m. The smaller the bending loss the better, and therefore there are no restrictions on the minimum value.

The effective area should be greater than or equal to 12 μm² and the bending loss should be less than or equal to 30 dB/m; more preferably, the effective area should be greater than or equal to 18 μm² and the bending loss should be less than or equal to 20 dB/m.

Preferably, in the WDM transmission path shown in FIG. 1, the used waveband comprises the entire S-band, C-band, and L-band, and dispersion-compensating fiber 2b compensates the accumulated dispersion of S-band optical signals, accumulated by transmission on the dispersion-shifted fiber 1, to a value greater than or equal to −1.0 ps/nm/km and less than or equal to 1.0 ps/nm/km, and more preferably greater than or equal to −0.8 ps/nm/km and less than or equal to 0.8 ps/nm/km.

The dispersion-compensating fiber 3b compensates the accumulated dispersion of C-band optical signals, accumulated by transmission on the dispersion-shifted fiber 1, to a value greater than or equal to −1.0 ps/nm/km and less than or equal to 1.0 ps/nm/km, and more preferably greater than or equal to −0.5 ps/nm/km and less than or equal to 0.5 ps/nm/km.

The dispersion-compensating fiber 4b compensates the accumulated dispersion of L-band optical signals, accumulated by transmission on the dispersion-shifted fiber 1, to a value greater than or equal to −1.0 ps/nm/km and less than or equal to 1.0 ps/nm/km, and more preferably greater than or equal to −0.5 ps/nm/km and less than or equal to 0.5 ps/nm/km.

The lengths of the dispersion-compensating fibers 2b, 3b, and 4b with respect to the dispersion-shifted fiber 1 are determined by the chromatic dispersion and dispersion slope of the dispersion-shifted fiber 1 in the compensation band, and by the chromatic dispersion and dispersion slope of the dispersion-compensating fibers 2b, 3b, and 4b, there being no particular restrictions. For example, in the case of the dispersion-compensating fiber 1 and the dispersion-compensating fiber 2b according to the embodiment of this invention, chromatic dispersion can be sufficiently compensated when the length of the dispersion-compensating fiber 2b is one-half to one-tenth of the length of the dispersion-shifted fiber 1, and preferably one-third to one-eighth. The same goes for the dispersion-compensating fibers 3b and 4b.

In this way, the dispersion-compensating transmission path according to the embodiment of this invention comprises a specific dispersion-shifted fiber having positive chromatic dispersion at all wavelengths from 1460 nm to 1630 nm, and one type of specific dispersion-compensating fiber having negative chromatic dispersion, or two or more types of dispersion-compensating fibers having different negative chromatic dispersions, in a compensation waveband selected from 1460 nm to 1630 nm. Therefore, the residual chromatic dispersion of the entire WDM transmission path can be adjusted in the used waveband of the WDM transmission path, selected from 1460 to 1630 nm, to a value greater than or equal to −1.0 ps/nm/km and less than or equal to 1.0 ps/nm/km, and more preferably greater than or equal to −0.5 ps/nm/km and less than or equal to 0.5 ps/nm/km, thereby providing the WDM transmission path which has large capacity and is suitable for long-distance transmission.

Incidentally, although the preceding explanation describes an example comprising a total of three types of dispersion-compensating fibers which are suitable for the S-band, C-band, and L-band, the constitution is not restricted to this. For example, one or two types may be selected from the three types of dispersion-compensating fibers in accordance with the actual used waveband of the WDM transmission path; alternatively, four or more types of dispersion-compensating fibers can be used. Similarly, the compensation waveband of optical signals, which are compensated by the dispersion-compensating fibers, can be arbitrary selected from 1460 nm to 1630 nm. There are no particular restrictions on the number of WDM optical signals (number of wavelengths) and the like.

EXPERIMENTAL EXAMPLE 1

Experimental examples of the present invention will be explained in detail.

The WDM transmission path shown in FIG. 1 was manufactured. The used waveband of the WDM transmission path comprises the S-band, C-band, and the L-band, i.e. 1460 nm to 1630 nm.

An optical fiber having the refractive index profile shown in FIG. 2 was used as the dispersion-shifted fiber 1. The structural parameters and optical characteristics of this dispersion-shifted fiber are shown in FIGS. 4A and 4B.

Optical fibers having the refractive index profile shown in FIG. 3 were used as the dispersion-compensating fibers 2b, 3b, and 4b.

Furthermore, the compensation waveband of the dispersion-compensating fiber 2b comprises the entire S-band (center wavelength: 1495 nm), the compensation waveband of the dispersion-compensating fiber 3b comprises the entire C-band (center wavelength: 1550 nm), and the compensation waveband of the dispersion-compensating fiber 4b comprises the entire L-band (center wavelength: 1600 nm).

The structural parameters and optical characteristics of these dispersion-compensating fibers are shown in FIGS. 5A and 5B, 6A and 6B, and 7A and 7B respectively.

In the diagrams, "2mλc" is a measurement of the cut-off wavelength in the reference length of 2m taken by using the method specified in ITU-T standard G.650, and the bending loss is a measurement taken when the bend diameter was 20 mm.

Figure 8A:
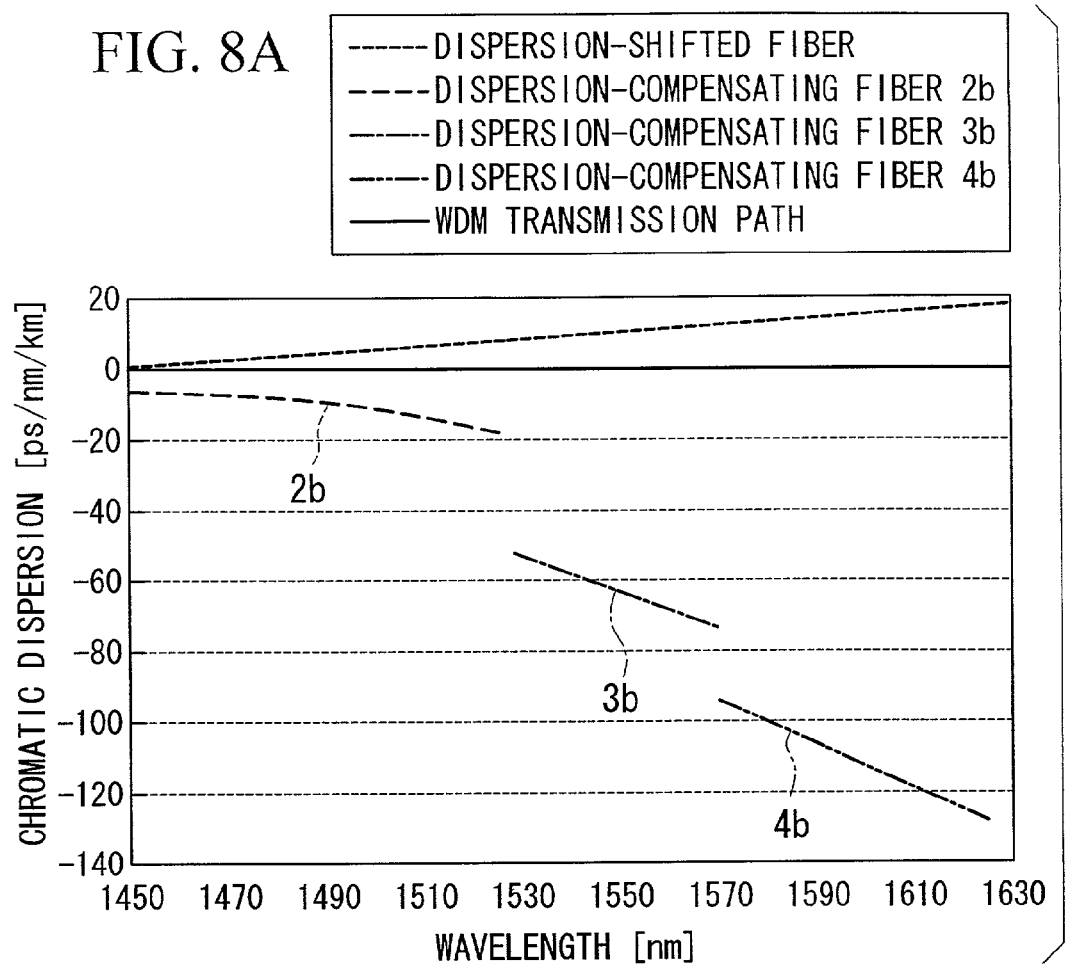
FIG. 8A shows the results of the experimental example 1, and is a graph showing the relationship between the wavelength and chromatic dispersion of optical fibers and a WDM transmission path.
Figure 8B:
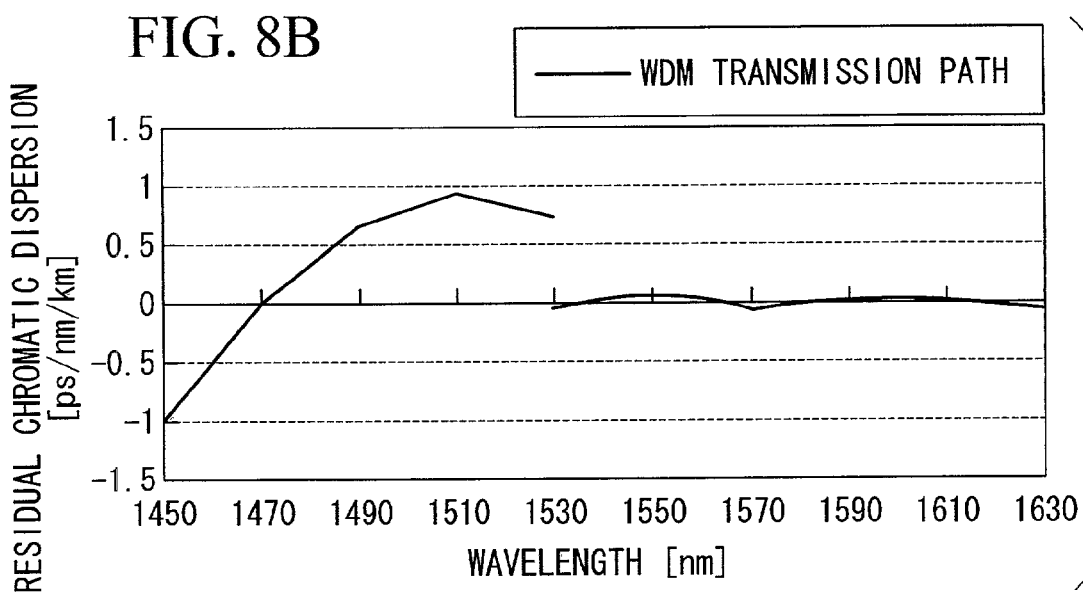
FIG. 8B shows the results of the experimental example 1, and is a graph showing in enlargement the relationship between the wavelength and residual chromatic dispersion of a WDM transmission path.

The lengths of the optical fibers are as follows.
dispersion-shifted fiber 1: 40 km
dispersion-compensating fiber 2b: 14.8 km
dispersion-compensating fiber 3b: 6.3 km
dispersion-compensating fiber 4b: 4.9 km FIG. 8A is a graph showing the relationship between chromatic dispersion and the wavelength of the optical fibers and the WDM transmission path. FIG. 8B is a graph showing in enlargement the relationship between residual chromatic dispersion and the wavelength of the WDM transmission path.

In the waveband 1450 nm to 1630 nm, the accumulated dispersion of the entire WDM transmission path was greater than or equal to −1 ps/nm/km and less than or equal to +1 ps/nm/km.

The relationship between residual chromatic dispersion of the entire transmission path, transmission distance, and transmission speed has already been described in existing documents. For example, U.S. Pat. No. 6,011,892 discloses an equation showing the relationship $$B^2 L \leq 104000/D$$

where B represents the transmission speed (Gbit/s), L represents the transmission distance (km), and D represents the residual chromatic dispersion of the transmission path (ps/nm/km).

For example, with a transmission distance of 500 km and a transmission speed of 10 Gbit/s, the residual chromatic dispersion must be less than or equal to 2.08 ps/nm/km; when the transmission speed is 40 Gbit/s, the residual chromatic dispersion must be less than or equal to 0.13 ps/nm/km.

In this experimental example, the maximum absolute value of the residual chromatic dispersion of the transmission path was 0.95 ps/nm/km in the S-band, 0.08 ps/nm/km in the C-band, and 0.05 ps/nm/km in the L-band.

From the point of view of residual chromatic dispersion, these results are sufficient for high-speed communication at greater than or equal to 10 Gbit/s in the S-band, and greater than or equal to 40 Gbit/s in the C-band and L-band. Furthermore, transmission loss presents no problem.

Thus it is clear that the WDM transmission path of this experimental example has sufficient residual chromatic dispersion for use in WDM communication in the entire band of wavelengths from 1450 nm to 1630 nm, and is suitable for large-capacity and high-speed communication.

EXPERIMENTAL EXAMPLE 2

This experimental example is the same as the experimental example 1, with the exceptions that the compensation waveband of the dispersion-compensating fiber 2b was set to 1490 nm to 1530 nm in the S-band (center wavelength: 1510 nm), and the lengths of the optical fibers were as follows.
dispersion-shifted fiber 1: 40 km
dispersion-compensating fiber 2b: 16.4 km
dispersion-compensating fiber 3b: 6.3 km
dispersion-compensating fiber 4b: 4.9 km FIGS. 9A and 9B show structural parameters and optical characteristics of the dispersion-compensating fiber 2b.

Figure 10A:
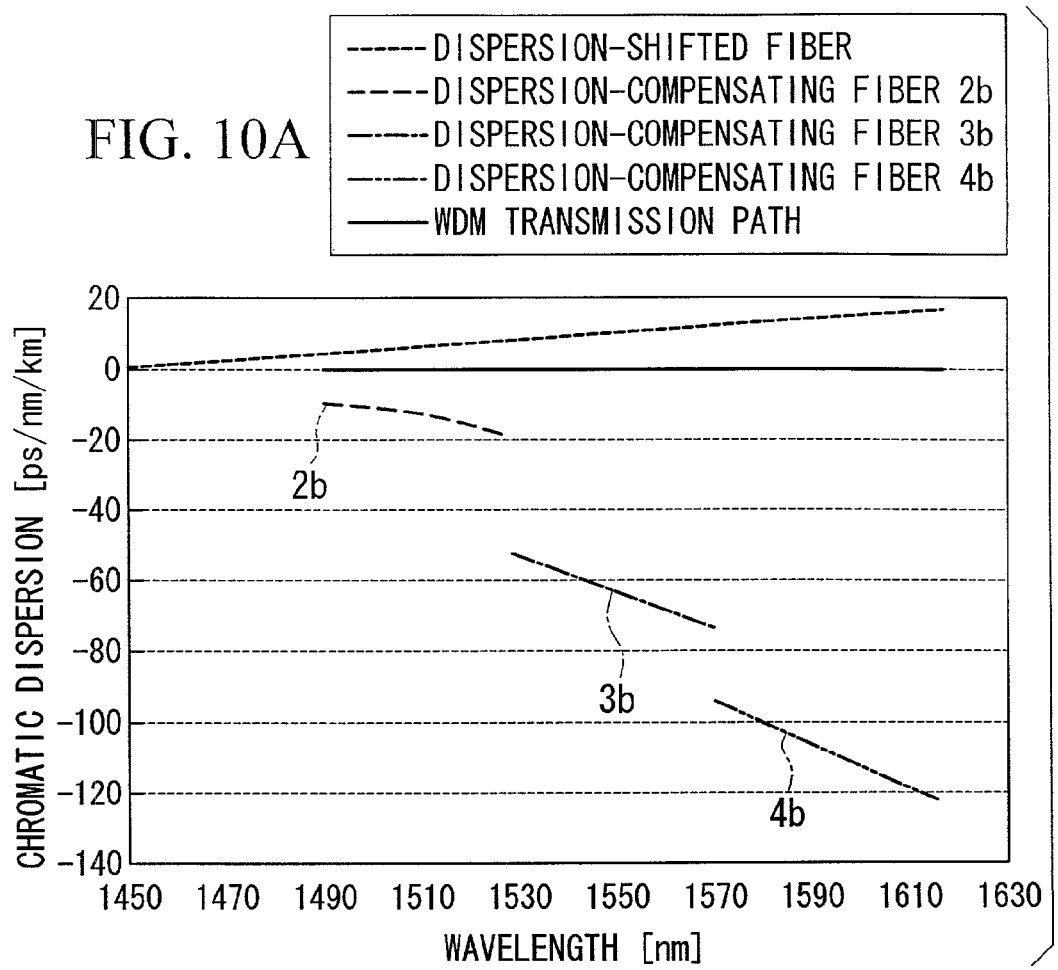
FIG. 10A shows the results of the experimental example 2, and is a graph showing the relationship between the wavelength and chromatic dispersion of optical fibers and a WDM transmission path.
Figure 10B:
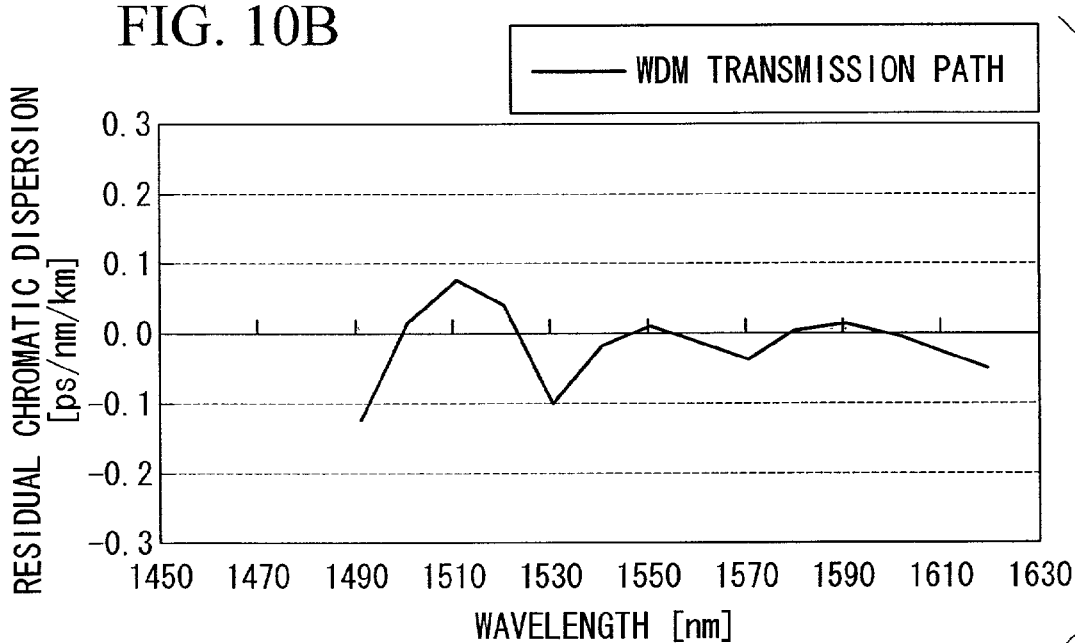
FIG. 10B shows the results of the experimental example 2, and is a graph showing in enlargement the relationship between the wavelength and residual chromatic dispersion of a WDM transmission path.

FIG. 10A is a graph showing the relationship between chromatic dispersion and the wavelength of the optical fibers and the WDM transmission path. FIG. 10B is a graph showing in enlargement the relationship between residual chromatic dispersion and the wavelength of the WDM transmission path.

In the waveband 1490 nm to 1620 nm, accumulated dispersion of the entire WDM transmission path was greater than or equal to −0.12 ps/nm/km and less than or equal to +0.12 ps/nm/km.

In this experimental example, the maximum absolute value of the residual chromatic dispersion of the transmission path was 0.12 ps/nm/km at 1490 nm to 1530 in the S-band, 0.08 ps/nm/km in the C-band, and 0.05 ps/nm/km in the L-band.

From the point of view of residual chromatic dispersion, these results are sufficient for high-speed communication at greater than or equal to 40 Gbit/s at 1490 nm to 1530 nm in the S-band. Furthermore, transmission loss presents no problem.

Thus it is clear that the WDM transmission path of this experimental example has sufficient residual chromatic dispersion for use in WDM communication in the band of wavelengths from 1490 nm to 1620 nm, and is suitable for large-capacity and high-speed communication.

EXPERIMENTAL EXAMPLE 3

FIGS. 11A and 11B show structural parameters and optical characteristics of a dispersion-compensating fiber, which can be used instead of the dispersion-compensating fiber 2b.

The length of the dispersion-compensating fiber was adjusted in accordance with the chromatic dispersion characteristics. FIG. 11C shows the length ratio, compensation wavelength range, and maximum absolute value of residual chromatic dispersion in the compensation wavelength range, in a case where dispersion-shifted fibers similar to those in the experimental examples 1 and 2 are linked.

As shown in this experimental example, the optical characteristics of the dispersion-compensating fiber of this experimental example can be adjusted in accordance with its intended use. Furthermore, when linked with the dispersion-shifted fiber to form a WDM transmission path, from the point of view of residual chromatic dispersion, the results are sufficient for high-speed communication at between 10 to 40 Gbit/s at 1460 nm to 1530 nm, or 1490 nm to 1530 nm, in the S-band. Furthermore, transmission loss presents no problem.

Thus it is clear that the WDM transmission path of this experimental example has sufficient residual chromatic dispersion for use in WDM communication in the band of wavelengths from 1460 nm to 1530 nm, and is suitable for large-capacity and high-speed communication.

EXPERIMENTAL EXAMPLE 4

This experimental example is the same as the experimental example 1, with the exceptions that the dispersion-shifted fiber 1 of the experimental examples 1 to 3 and one type of the dispersion-compensating fiber having the structural parameters shown in FIG. 12A were used, and the compensation waveband of the dispersion-compensating fiber was set to 1530 nm to 1630 nm, which comprises the C-band and the L-band, and the lengths of the optical fibers were as follows.

dispersion-shifted fiber 1: 40 km
dispersion-compensating fiber: 3.0 km

FIGS. 12A and 12B show structural parameters and optical characteristics of the dispersion-compensating fiber.

Figure 13A:
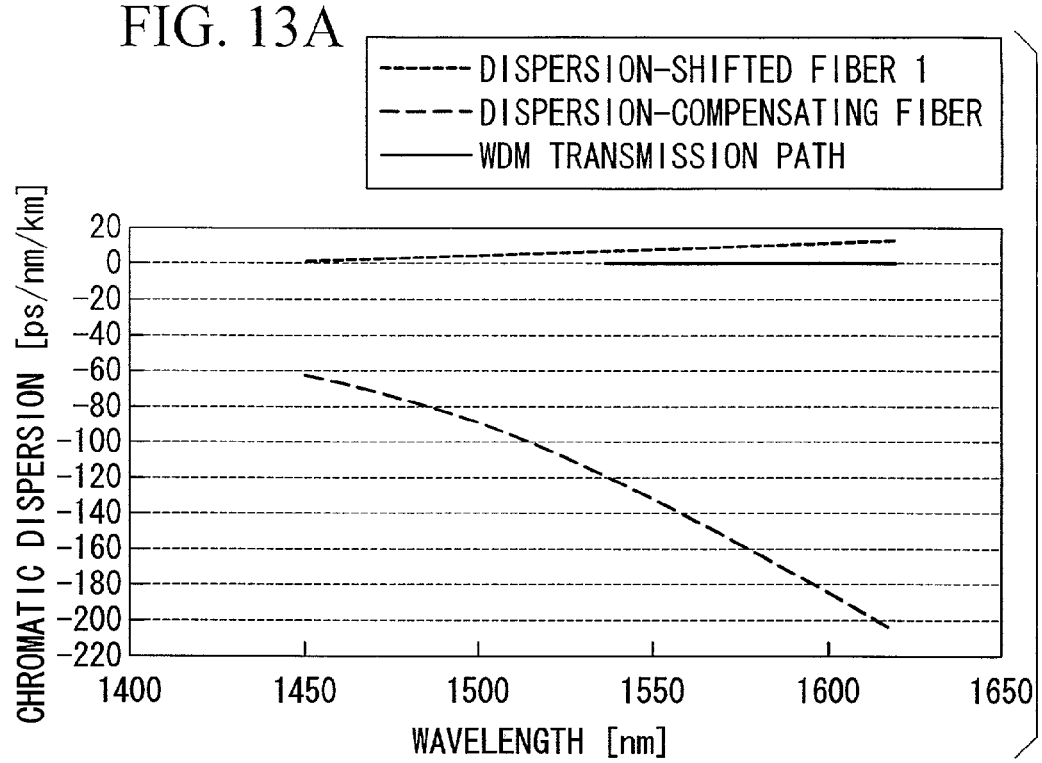
FIG. 13A shows the results of the experimental example 4, and is a graph showing the relationship between the wavelengths and chromatic dispersion of optical fibers and a WDM transmission path.
Figure 13B:
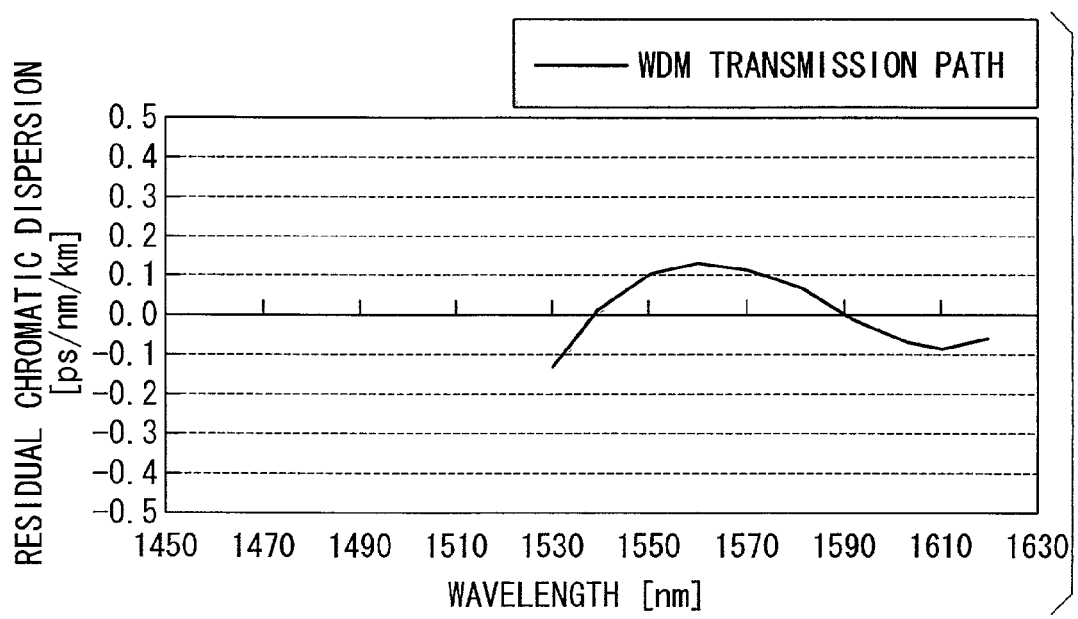
FIG. 13B shows the results of the experimental example 4, and is a graph showing in enlargement the relationship between the wavelength and residual chromatic dispersion of a WDM transmission path.

FIG. 13A is a graph showing the relationship between chromatic dispersion and the wavelength of the optical fibers and the WDM transmission path. FIG. 13B is a graph showing in enlargement the relationship between residual chromatic dispersion and the wavelength of the WDM transmission path.

In the waveband 1530 nm to 1630 nm, the residual chromatic dispersion of the entire WDM transmission path was greater than or equal to −0.13 ps/nm/km and less than or equal to +0.13 ps/nm/km.

From the point of view of residual chromatic dispersion, these results are sufficient for high-speed communication at greater than or equal to 40 Gbit/s at wavelengths of 1530 nm to 1630 nm. Furthermore, transmission loss presents no problem.

Thus it is clear that the WDM transmission path of this experimental example has sufficient residual chromatic dispersion for use in WDM communication in the band of wavelengths from 1530 nm to 1630 nm, and is suitable for large-capacity and high-speed communication.

Since this type of WDM transmission path is a hybrid optical fiber link comprising the dispersion-shifted fiber and one type of dispersion-compensating fiber, in addition to being connected as a module midway along the path to compensate dispersion, it is also possible to connect the two types of optical fibers in cable format for use on the sea-bed.

EXPERIMENTAL EXAMPLE 5

FIGS. 14A and 14B show structural parameters and optical characteristics of a dispersion-compensating fiber, which can be used instead of the dispersion-compensating fiber 3b.

The length of the dispersion-compensating fiber was adjusted in accordance with the chromatic dispersion characteristics. FIG. 14C shows the length ratio, compensation wavelength range, and maximum absolute value of residual chromatic dispersion in the compensation wavelength range, in a case where dispersion-shifted fibers similar to those in the experimental examples 1 to 4 are linked.

As shown in this experimental example, the optical characteristics of the dispersion-compensating fiber can be adjusted in accordance with its intended use. Furthermore, when linked with the dispersion-shifted fiber to form a WDM transmission path, from the point of view of residual chromatic dispersion, the results are sufficient for high-speed communication at between 10 to 40 Gbit/s in the C-band of 1530 nm to 1570 nm. Furthermore, transmission loss presents no problem.

Thus it is clear that the WDM transmission path of this experimental example has sufficient residual chromatic dispersion for use in WDM communication in the band of wavelengths from 1530 nm to 1570 nm, and is suitable for large-capacity and high-speed communication.

EXPERIMENTAL EXAMPLE 6

FIGS. 15A and 15B show structural parameters and optical characteristics of a dispersion-compensating fiber, which can be used instead of the dispersion-compensating fiber 4b.

The length of the dispersion-compensating fiber was adjusted in accordance with the chromatic dispersion characteristics. FIG. 15C shows the length ratio, compensation wavelength range, and maximum absolute value of residual chromatic dispersion in the compensation wavelength range, in a case where dispersion-shifted fibers similar to those in the experimental examples 1 to 5 are linked.

As shown in this experimental example, the optical characteristics of the dispersion-compensating fiber can be adjusted in accordance with its intended use. Furthermore, when linked with the dispersion-shifted fiber to form a WDM transmission path, from the point of view of residual chromatic dispersion, the results are sufficient for high-speed communication at between 10 to 40 Gbit/s in the L-band of 1570 nm to 1630 nm. Furthermore, transmission loss presents no problem.

Thus it is clear that the WDM transmission path of this experimental example has sufficient residual chromatic dispersion for use in WDM communication in the band of wavelengths from 1570 nm to 1630 nm, and is suitable for large-capacity and high-speed communication.

What is claimed is:

1. A wavelength division multiplexed transmission path comprising:
   a dispersion-compensating transmission path comprising a dispersion-shifted fiber, and one type of dispersion-compensating fiber, or two or more types of dispersion-compensating fiber having different chromatic dispersion,
   wherein the dispersion-shifted fiber comprises: a) a central core segment; a peripheral core segment, provided on the outer periphery of the central core segment; and a clad, provided on the outer periphery of the peripheral core segment, the refractive index profile of the dispersion-shifted fiber is such that the peripheral core segment has a higher refractive index than the central core segment, and the clad has a lower refractive index than the peripheral core segment, the dispersion-shifted fiber has positive chromatic dispersion in a waveband of 1460 nm to 1630 nm, the dispersion-shifted fiber has: c) chromatic dispersion of greater than or equal to +6.0 ps/nm/km and less than or equal to +10 ps/nm/km at a wavelength of 1550 nm; d) a dispersion slope of less than or equal to +0.09 ps/nm$^2$/km at a wavelength of 1550 nm; and e) an effective area of greater than or equal to 80 µm², and less than or equal to 120 µm² at a wavelength of 1550 nm, the relative refractive index difference of the central core segment with respect to the clad is greater than or equal to −0.1% and less than or equal to 0.1%, the relative refractive index difference of the peripheral core segment with respect to the clad is greater than or equal to 0.7% and less than or equal to 1.2%, and the radius of the central core segment is greater than or equal to 3.0 µm and less than or equal to 5.0 µm, the dispersion-compensating fiber comprises: b) a central core segment; an intermediate core segment, provided on the outer periphery of the central core segment; a ring core segment, provided on the outer periphery of the intermediate core segment; and a clad, provided on the outer periphery of the ring core segment, the refractive index profile of the dispersion-compensating fiber is such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber has negative chromatic dispersion in the compensation waveband of the dispersion-compensating fiber, selected from 1460 nm to 1630 nm, the ratio of the radius of the intermediate core segment to the radius of the central core segment is between 2.0 and 3.0, and the ratio of the radius of the ring core segment to the radius of the central core segment is between 3.0 and 5.0, at least one type of dispersion-compensating fiber A comprising the dispersion-compensating transmission path is capable of actual single mode transmission at a wavelength of 1530 nm; and when a dispersion-shifted fiber satisfying the conditions of c) to e) has been compensated, the dispersion compensation rate defined by (Sc1/Dc1)/(Ss1/Ds1) (where Dc1 and Sc1 respectively represent the chromatic dispersion and dispersion slope of the dispersion-compensating fiber A at the center wavelength of the compensation waveband, selected from wavelengths from 1530 nm to 1570 nm, and Ds1 and Ss1 respectively represent the chromatic dispersion and dispersion slope of the compensated dispersion-shifted fiber at the center wavelength of the compensation waveband of the dispersion-compensating fiber A) is greater than or equal to 80% and less than or equal to 120%; in the dispersion-compensating fiber A, the relative refractive index difference of the central core segment with respect to the clad is greater than or equal to 1.0% and less than or equal to 1.7%, the relative refractive index difference of the intermediate core segment with respect to the clad is greater than or equal to −1.5% and less than or equal to −0.5%, the relative refractive index difference of the ring core segment with respect to the clad is greater than 0% and less than or equal to 0.6%, the radius of the ring core segment is greater than or equal to 5 µm and less than or equal to 15 µm, the dispersion slope of the dispersion-compensating fiber A at a wavelength of 1550 nm is greater than or equal to −1.0 ps/nm²/km and less than or equal to −0.3 ps/nm²/km, the dispersion-compensating fiber A has an effective area of greater than or equal to 12 µm² at a central wavelength of the compensation waveband of the dispersion-compensating fiber A, and a bending loss (being the bending loss of a bend diameter of 20 nm at the central wavelength of the compensation waveband) of less than or equal to 30 dB/m, and the dispersion-compensating fiber A has chromatic dispersion of between −120 to −20 ps/nm/km in the compensation waveband, and the chromatic dispersion of the wavelength division multiplexed transmission path is greater than or equal to −1.0 ps/nm/km and less than or equal to +1.0 ps/nm/km in a used waveband of the wavelength division multiplexed transmission path, which is selected from 1460 nm to 1630 nm.

2. The wavelength division multiplexed transmission path as claimed in claim 1, wherein the dispersion-compensating fiber A has the effective area of greater than or equal to 18 µm² and the bending loss of less than or equal to 20 dB/m.

3. A wavelength division multiplexed transmission path comprising:

a dispersion-compensating transmission path comprising a dispersion-shifted fiber, and one type of dispersion-compensating fiber, or two or more types of dispersion-compensating fiber having different chromatic dispersion, wherein the dispersion-shifted fiber comprises a) a central core segment; a peripheral core segment, provided on the outer periphery of the central core segment; and a clad, provided on the outer periphery of the peripheral core segment, the refractive index profile of the dispersion-shifted fiber is such that the peripheral core segment has a higher refractive index than the central core segment, and the clad has a lower refractive index than the peripheral core segment, the dispersion-shifted fiber has positive chromatic dispersion in a waveband of 1460 nm to 1630 nm, the dispersion-shifted fiber has: c) chromatic dispersion of greater than or equal to +6.0 ps/nm/km and less than or equal to +10 ps/nm/km at a wavelength of 1550 nm; d) a dispersion slope of less than or equal to +0.09 ps/nm²/km at a wavelength of 1550 nm; and e) an effective area of greater than or equal to 80 µm², and less than or equal to 120 µm² at a wavelength of 1550 nm, the relative refractive index difference of the central core segment with respect to the clad is greater than or equal to −0.1% and less than or equal to 0.1%, the relative refractive index difference of the peripheral core segment with respect to the clad is greater than or equal to 0.7% and less than or equal to 1.2%, and the radius of the central core segment is greater than or equal to 3.0 µm and less than or equal to 5.0 µm, the dispersion-compensating fiber comprises b) a central core segment; an intermediate core segment, provided on the outer periphery of the central core segment; a ring core segment, provided on the outer periphery of the intermediate core segment; and a clad, provided on the outer periphery of the ring core segment, the refractive index profile of the dispersion-compensating fiber is such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber has negative chromatic dispersion in the compensation waveband of the dispersion-compensating fiber, selected from 1460 nm to 1630 nm, the ratio of the radius of the intermediate core segment to the radius of the central core segment is between 2.0 and 3.0, and the ratio of the radius of the ring core segment to the radius of the central core segment is between 3.0 and 5.0, at least one type of dispersion-compensating fiber B comprising the dispersion-compensating transmission path is capable of actual single mode transmission at a wavelength of 1570 nm; and when a dispersion-shifted fiber satisfying the conditions of c) to e) has been compensated, the dispersion compensation rate defined by (Sc2/Dc2)/(Ss2/Ds2) (where Dc2 and Sc2 respectively represent the chromatic dispersion and dispersion slope of the dispersion-compensating fiber B at the center wavelength of the compensation waveband, selected from wavelengths from 1570 nm to 1630 nm, and Ds2 and Ss2 respectively represent the chromatic dispersion and dispersion slope of the compensated dispersion-shifted fiber at the center wavelength of the compensation waveband of the dispersion-compensating fiber B) is greater than or equal to 80% and less than or equal to 120%, in the dispersion-compensating fiber B, the relative refractive index difference of the central core segment with respect to the clad is greater than or equal to 1.0% and less than or equal to 1.7%, the relative refractive index difference of the intermediate core segment with respect to the clad is greater than or equal to $-1.5\%$ and less than or equal to $-0.5\%$, the relative refractive index difference of the ring core segment with respect to the clad is greater than 0% and less than or equal to 0.6%, the radius of the ring core segment is greater than or equal to 5 µm and less than or equal to 15 µm, the dispersion slope of the dispersion-compensating fiber B at a wavelength of 1550 nm is greater than or equal to $-1.0$ ps/nm$^2$/km and less than or equal to $-0.3$ ps/nm$^2$/km, the dispersion-compensating fiber B has an effective area of greater than or equal to 12 µm$^2$ at a central wavelength of the compensation waveband of the dispersion-compensating fiber B, and a bending loss (being the bending loss of a bend diameter of 20 mm at the central wavelength of the compensation waveband) of less than or equal to 30 dB/m, and the dispersion-compensating fiber B has chromatic dispersion of between $-200$ and $-60$ ps/nm/km in the compensation waveband, and the chromatic dispersion of the wavelength division multiplexed transmission path is greater than or equal to $-1.0$ ps/nm/km and less than or equal to $+1.0$ ps/nm/km in a used waveband of the wavelength division multiplexed transmission path, which is selected from 1460 nm to 1630 nm.

4. The wavelength division multiplexed transmission path as claimed in claim 3, wherein the dispersion-compensating fiber B has the effective area of greater than or equal to 18 µm$^2$ and the bending loss of less than or equal to 20 dB/m.

5. A wavelength division multiplexed transmission path comprising:

a dispersion-compensating transmission path comprising a dispersion-shifted fiber, and one type of dispersion-compensating fiber, or two or more types of dispersion-compensating fiber having different chromatic dispersion, wherein the dispersion-shifted fiber comprises a) a central core segment; a peripheral core segment, provided on the outer periphery of the central core segment; and a clad, provided on the outer periphery of the peripheral core segment, the refractive index profile of the dispersion-shifted fiber is such that the peripheral core segment has a higher refractive index than the central core segment, and the clad has a lower refractive index than the peripheral core segment, the dispersion-shifted fiber has positive chromatic dispersion in a waveband of 1460 nm to 1630 nm, the dispersion-shifted fiber has: c) chromatic dispersion of greater than or equal to $+6.0$ ps/nm/km and less than or equal to $+10$ ps/nm/km at a wavelength of 1550 nm; d) a dispersion slope of less than or equal to $+0.09$ ps/nm$^2$/km at a wavelength of 1550 nm; and e) an effective area of greater than or equal to 80 µm$^2$, and less than or equal to 120 µm$^2$ at a wavelength of 1550 nm, the relative refractive index difference of the central core segment with respect to the clad is greater than or equal to $-0.1\%$ and less than or equal to 0.1%, the relative refractive index difference of the peripheral core segment with respect to the clad is greater than or equal to 0.7% and less than or equal to 1.2%, and the radius of the central core segment is greater than or equal to 3.0 µm and less than or equal to 5.0 µm, the dispersion-compensating fiber comprises: b) a central core segment; an intermediate core segment, provided on the outer periphery of the central core segment; a ring core segment, provided on the outer periphery of the intermediate core segment; and a clad, provided on the outer periphery of the ring core segment, the refractive index profile of the dispersion-compensating fiber is such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber has negative chromatic dispersion in the compensation waveband of the dispersion-compensating fiber, selected from 1460 nm to 1630 nm, the ratio of the radius of the intermediate core segment to the radius of the central core segment is between 2.0 and 3.0, and the ratio of the radius of the ring core segment to the radius of the central core segment is between 3.0 and 5.0, at least one type of dispersion-compensating fiber C comprising the dispersion-compensating transmission path is capable of actual single-mode transmission at a wavelength of 1460 nm; and when a dispersion-shifted fiber satisfying the conditions of c) to e) has been compensated, the dispersion compensation rate defined by (Sc3/Dc3)/(Ss3/Ds3) (where Dc3 and Sc3 respectively represent the chromatic dispersion and dispersion slope of the dispersion-compensating fiber C at the center wavelength of the compensation waveband, selected from wavelengths from 1460 nm to 1530 nm, and Ds3 and Ss3 respectively represent the chromatic dispersion and dispersion slope of the compensated dispersion-shifted fiber at the center wavelength of the compensation waveband of the dispersion-compensating fiber C) is greater than or equal to 80% and less than or equal to 120%, in the dispersion-compensating fiber C, the relative refractive index difference of the central core segment with respect to the clad is greater than or equal to 1.0% and less than or equal to 1.7%, the relative refractive index difference of the intermediate core segment with respect to the clad is greater than or equal to $-1.5\%$ and less than or equal to $-0.5\%$, the relative refractive index difference of the ring core segment with respect to the clad is greater than 0% and less than or equal to 0.6%, the radius of the ring core segment is greater than or equal to 5 μm and less than or equal to 15 μm, the dispersion slope of the dispersion-compensating fiber C at a wavelength of 1550 nm is greater than or equal to −1.0 ps/nm²/km and less than or equal to −0.3 ps/nm²/km, the dispersion-compensating fiber C has an effective area of greater than or equal to 12 μm² at a central wavelength of the compensation waveband of the dispersion-compensating fiber C, and a bending loss (being the bending loss of a bend diameter of 20 mm at the central wavelength of the compensation waveband) of less than or equal to 30 dB/m, and the dispersion-compensating fiber C has chromatic dispersion of between −150 to −4 ps/nm/km in the compensation waveband, and the chromatic dispersion of the wavelength division multiplexed transmission path is greater than or equal to −1.0 ps/nm/km and less than or equal to +1.0 ps/nm/km in a used waveband of the wavelength division multiplexed transmission path, which is selected from 1460 nm to 1630 nm.

6. The wavelength division multiplexed transmission path as claimed in claim 5, wherein the dispersion-compensating fiber C has the effective area of greater than or equal to 18 μm² and the bending loss of less than or equal to 20 dB/m.

7. A dispersion-compensating fiber comprising: a central core segment; an intermediate core segment, provided on the outer periphery of the central core segment; a ring core segment, provided on the outer periphery of the intermediate core segment; and a clad, provided on the outer periphery of the ring core segment, wherein the refractive index profile of the dispersion-compensating fiber is such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber has negative chromatic dispersion in the compensation waveband of the dispersion-compensating fiber, selected from 1460 nm to 1630 nm, in the dispersion-compensating fiber, the ratio of the radius of the intermediate core segment to the radius of the central core segment is between 2.0 and 3.0, and the ratio of the radius of the ring core segment to the radius of the central core segment is between 3.0 and 5.0, the dispersion-compensating fiber is capable of actual single mode transmission at a wavelength of 1530 nm, when a dispersion-shifted fiber having positive chromatic dispersion in the waveband of 1460 nm to 1630 nm, having: c) chromatic dispersion of greater than or equal to +6.0 ps/nm/km and less than or equal to +10 ps/nm/km at a wavelength of 1550 nm; d) a dispersion slope of less than or equal to +0.09 ps/nm²/km at a wavelength of 1550 nm; and e) an effective area of greater than or equal to 80 μm², and less than or equal to 120 μm² at a wavelength of 1550 nm, the relative refractive index difference of the central core segment with respect to the clad being greater than or equal to −0.1% and less than or equal to 0.1%, the relative refractive index difference of the peripheral core segment with respect to the clad being greater than or equal to 0.7% and less than or equal to 1.2%, and the radius of the central core segment being greater than or equal to 3.0 μm and less than or equal to 5.0 μm, has been compensated, the dispersion compensation rate defined by (Sc1/Dc1)/(Ss1/Ds1) (where Dc1 and Sc1 respectively represent the chromatic dispersion and dispersion slope of the dispersion-compensating fiber at the center wavelength of the compensation waveband, selected from wavelengths from 1530 nm to 1570 nm, and Ds1 and Ss1 respectively represent the chromatic dispersion and dispersion slope of the compensated dispersion-shifted fiber at the center wavelength of the compensation waveband of the dispersion-compensating fiber) is greater than or equal to 80% and less than or equal to 120%, in the dispersion-compensating fiber, the relative refractive index difference of the central core segment with respect to the clad is greater than or equal to 1.0% and less than or equal to 1.7%, the relative refractive index difference of the intermediate core segment with respect to the clad is greater than or equal to −1.5% and less than or equal to −0.5%, the relative refractive index difference of the ring core segment with respect to the clad is greater than 0% and less than or equal to 0.6%, and the radius of the ring core segment is greater than or equal to 5 μm and less than or equal to 15 μm, the dispersion slope of the dispersion-compensating fiber at a wavelength of 1550 nm is greater than or equal to −1.0 ps/nm²/km and less than or equal to −0.3 ps/nm²/km, the dispersion-compensating fiber has an effective area of greater than or equal to 12 μm² at a central wavelength of the compensation waveband of the dispersion-compensating fiber, and a bending loss (being the bending loss of a bend diameter of 20 mm at the central wavelength of the compensation waveband) of less than or equal to 30 dB/m, the dispersion-compensating fiber has chromatic dispersion of between −120 to −20 ps/nm/km in the compensation waveband, and when linked with the dispersion-shifted fiber to form a wavelength division multiplexed transmission path, the residual chromatic dispersion of the wavelength division multiplexed transmission path is greater than or equal to −1.0 ps/nm/kin and less than or equal to +1.0 ps/nm/km in a used waveband of the wavelength division multiplexed transmission path, selected from 1460 nm to 1630 nm.

8. A dispersion-compensating fiber comprising: a central core segment; an intermediate core segment, provided on the outer periphery of the central core segment; a ring core segment, provided on the outer periphery of the intermediate core segment; and a clad, provided on the outer periphery of the ring core segment, wherein the refractive index profile of the dispersion-compensating fiber is such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber has negative chromatic dispersion in the compensation waveband of the dispersion-compensating fiber, selected from 1460 nm to 1630 nm, in the dispersion-compensating fiber, the ratio of the radius of the intermediate core segment to the radius of the central core segment is between 2.0 and 3.0, and the ratio of the radius of the ring core segment to the radius of the central core segment is between 3.0 and 5.0, the dispersion-compensating fiber is capable of actual single mode transmission at a wavelength of 1570 nm, when a dispersion-shifted fiber having positive chromatic dispersion in the waveband of 1460 nm to 1630 nm, having: c) chromatic dispersion of greater than or equal to +6.0 ps/nm/km and less than or equal to +10 ps/nm/km at a wavelength of 1550 nm; d) a dispersion slope of less than or equal to +0.09 ps/nm$^2$/km at a wavelength of 1550 nm; and e) an effective area of greater than or equal to 80 µm$^2$, and less than or equal to 120 µm$^2$ at a wavelength of 1550 nm, the relative refractive index difference of the central core segment with respect to the clad being greater than or equal to −0.1% and less than or equal to 0.1%, the relative refractive index difference of the peripheral core segment with respect to the clad being greater than or equal to 0.7% and less than or equal to 1.2%, and the radius of the central core segment being greater than or equal to 3.0 tm and less than or equal to 5.0 µm, has been compensated, the dispersion compensation rate defined by (Sc2/Dc2)/(Ss2/Ds2) (where Dc2 and Sc2 respectively represent the chromatic dispersion and dispersion slope of the dispersion-compensating fiber at the center wavelength of the compensation waveband, selected from wavelengths from 1570 nm to 1630 nm, and Ds2 and Ss2 respectively represent the chromatic dispersion and dispersion slope of the compensated dispersion-shifted fiber at the center wavelength of the compensation waveband of the dispersion-compensating fiber) is greater than or equal to 80% and less than or equal to 120%, in the dispersion-compensating fiber, the relative refractive index difference of the central core segment with respect to the clad is greater than or equal to 1.0% and less than or equal to 1.7%, the relative refractive index difference of the intermediate core segment with respect to the clad is greater than or equal to −1.5% and less than or equal to −0.5%, the relative refractive index difference of the ring core segment with respect to the clad is greater than 0% and less than or equal to 0.6%, and the radius of the ring core segment is greater than or equal to 5 µm and less than or equal to 15 µm, the dispersion slope of the dispersion-compensating fiber at a wavelength of 1550 nm is greater than or equal to −1.0 ps/nm$^2$/km and less than or equal to −0.3 ps/nm/km, the dispersion-compensating fiber has an effective area of greater than or equal to 12 µm$^2$ at a central wavelength of the compensation waveband of the dispersion-compensating fiber, and a bending loss (being the bending loss of a bend diameter of 20 mm at the central wavelength of the compensation waveband) of less than or equal to 30 dB/m, the dispersion-compensating fiber has chromatic dispersion of between −200 and −60 ps/nm/km in the compensation waveband, and when linked with the dispersion-shifted fiber to form a wavelength division multiplexed transmission path, the residual chromatic dispersion of the wavelength division multiplexed transmission path being greater than or equal to −1.0 ps/nm/km and less than or equal to +1.0 ps/nm/km in a used waveband of the wavelength division multiplexed transmission path, selected from 1460 nm to 1630 nm.

9. A dispersion-compensating fiber comprising: a central core segment; an intermediate core segment, provided on the outer periphery of the central core segment; a ring core segment, provided on the outer periphery of the intermediate core segment; and a clad, provided on the outer periphery of the ring core segment, wherein the refractive index profile of the dispersion-compensating fiber is such that the intermediate core segment has a lower refractive index than the central core segment, the ring core segment has a refractive index which is higher than that of the intermediate core segment but lower than that of the central core segment, and the clad has a refractive index which is lower than that of the ring core segment but higher than that of the intermediate core segment, the dispersion-compensating fiber has negative chromatic dispersion in the compensation waveband of the dispersion-compensating fiber, selected from 1460 nm to 1630 nm, in the dispersion-compensating fiber, the ratio of the radius of the intermediate core segment to the radius of the central core segment is between 2.0 and 3.0, and the ratio of the radius of the ring core segment to the radius of the central core segment is between 3.0 and 5.0, the dispersion-compensating fiber is capable of actual single-mode transmission at a wavelength of 1460 nm, when a dispersion-shifted fiber having positive chromatic dispersion in the waveband of 1460 nm to 1630 nm, having: c) chromatic dispersion of greater than or equal to +6.0 ps/nm/km and less than or equal to +10 ps/nm/km at a wavelength of 1550 nm; d) a dispersion slope of less than or equal to +0.09 ps/nm$^2$/km at a wavelength of 1550 nm; and e) an effective area of greater than or equal to 80 µm$^2$, and less than or equal to 120 µm$^2$ at a wavelength of 1550 nm, the relative refractive index difference of the central core segment with respect to the clad being greater than or equal to −0.1% and less than or equal to 0.1%, the relative refractive index difference of the peripheral core segment with respect to the clad being greater than or equal to 0.7% and less than or equal to 1.2%, and the radius of the central core segment being greater than or equal to 3.0 µm and less than or equal to 5.0 µm, has been compensated, the dispersion compensation rate defined by (Sc3/Dc3)/(Ss3/Ds3) (where Dc3 and Sc3 respectively represent the chromatic dispersion and dispersion slope of the dispersion-compensating fiber at the center wavelength of the compensation waveband, selected from wavelengths from 1460 nm to 1530 nm, and Ds3 and Ss3 respectively represent the chromatic dispersion and dispersion slope of the compensated dispersion-shifted fiber at the center wavelength of the compensation waveband of the dispersion-compensating fiber) is greater than or equal to 80% and less than or equal to 120%, in the dispersion-compensating fiber, the relative refractive index difference of the central core segment with respect to the clad is greater than or equal to 1.0% and less than or equal to 1.7%, the relative refractive index difference of the intermediate core segment with respect to the clad is greater than or equal to −1.5% and less than or equal to −0.5%, the relative refractive index difference of the ring core segment with respect to the clad is greater than 0% and less than or equal to 0.6%, and the radius of the ring core segment is greater than or equal to 5 µm and less than or equal to 15 µm, the dispersion slope of the dispersion-compensating fiber at a wavelength of 1550 nm being greater than or equal to −1.0 ps/nm$^2$/km and less than or equal to −0.3 ps/nm$^2$/km, the dispersion-compensating fiber has an effective area of greater than or equal to 12 µm$^2$ at a central wavelength of the compensation waveband of the dispersion-compensating fiber, and a bending loss (being the bending loss of a bend diameter of 20 mm at the central wavelength of the compensation waveband) of less than or equal to 30 dB/m, the dispersion-compensating fiber has chromatic dispersion of between −150 to −4 ps/nm/km in the compensation waveband, and when linked with the dispersion-shifted fiber to form a wavelength division multiplexed transmission path, the residual chromatic dispersion of the wavelength division multiplexed transmission path is greater than or equal to −1.0 ps/nm/km and less than or equal to +1.0 ps/nm/km in a used waveband of the wavelength division multiplexed transmission path, selected from 1460 nm to 1630 nm.

* * * * *